US 12,470,765 B2

United States Patent
Hayata

(10) Patent No.: US 12,470,765 B2
(45) Date of Patent: Nov. 11, 2025

(54) PROGRAM, INFORMATION PROCESSING METHOD, AND INFORMATION PROCESSING DEVICE

(71) Applicant: GREE, INC., Tokyo (JP)

(72) Inventor: Daiki Hayata, Tokyo (JP)

(73) Assignee: GREE, INC., Tokyo (JP)

( * ) Notice: Subject to any disclaimer, the term of this patent is extended or adjusted under 35 U.S.C. 154(b) by 71 days.

(21) Appl. No.: 18/129,505

(22) Filed: Mar. 31, 2023

(65) Prior Publication Data

US 2024/0007700 A1 Jan. 4, 2024

(51) Int. Cl.
| | |
|---|---|
| *H04N 5/445* | (2011.01) |
| *H04N 21/431* | (2011.01) |
| *H04N 21/442* | (2011.01) |
| *H04N 21/4788* | (2011.01) |
| *H04N 21/81* | (2011.01) |

(52) U.S. Cl.
CPC ... *H04N 21/4312* (2013.01); *H04N 21/44204* (2013.01); *H04N 21/4788* (2013.01); *H04N 21/8146* (2013.01)

(58) Field of Classification Search
CPC ......... H04N 21/4312; H04N 21/44204; H04N 21/4788; H04N 21/8146
See application file for complete search history.

(56) References Cited

U.S. PATENT DOCUMENTS

| | | | | |
|---|---|---|---|---|
| 2015/0120767 | A1* | 4/2015 | Skeen | G06F 16/335 707/754 |
| 2016/0110659 | A1* | 4/2016 | Skeen | H04N 21/4826 705/5 |
| 2017/0006322 | A1* | 1/2017 | Dury | H04N 21/254 |
| 2017/0178034 | A1* | 6/2017 | Skeen | H04N 21/252 |
| 2022/0167022 | A1* | 5/2022 | Bettner | H04N 21/472 |
| 2023/0154113 | A1* | 5/2023 | Pratt | G06Q 30/016 345/473 |
| 2023/0260219 | A1* | 8/2023 | Doken | H04N 21/23418 345/633 |

FOREIGN PATENT DOCUMENTS

JP 2015-184689 A 10/2015

* cited by examiner

*Primary Examiner* — Annan Q Shang
(74) *Attorney, Agent, or Firm* — Oliff PLC

(57) ABSTRACT

A user device executes (i) a first output control process that outputs, to a display, a video including a first avatar object to which tracking data showing movement of a distributing user is applied; and (ii) a second output control process that, when an action with respect to the video of a second user who views the video corresponds to a predetermined reference action, outputs to the display a video including (a) a second avatar object to which movement of the second user is not applied, and (b) the first avatar object.

20 Claims, 14 Drawing Sheets

| USER ID | COINS | POINTS |
|---|---|---|
| 0011 | 1000C | 1000pt |
| 0012 | 500C | 2000pt |
| : | : | : |

| AVATAR | MODEL TYPE | HEIGHT | SKIN COLOR | BODY TYPE | PARTS (EYES) | ·· |
|---|---|---|---|---|---|---|
| 1 | F TYPE | *** | *** | *** | *** | *** |
| 2 | F TYPE | *** | *** | *** | *** | *** |
| 3 | M TYPE | *** | *** | *** | *** | *** |

| PARTS ID | ITEM NAME | PART | AVATAR ATTRIBUTE | COLOR | APPLICABLE AVATAR |
|---|---|---|---|---|---|
| *** | BEGINNER T SHIRT | UPPER BODY | All | Black | 2 |
| *** | COLOR CONTACT LENS | EYES | All | Blue | 1 |
| *** | POINTY HAT | HEAD | All | Red | 3 |
| *** | BOOTS | LEGS | F TYPE | Purple | 1 |
| : | : | : | : | : | : |

PROGRAM, INFORMATION PROCESSING METHOD, AND INFORMATION PROCESSING DEVICE

This application claims the benefit of priority from Japanese Patent Application No. 2022-104194 filed Jun. 29, 2022, the entire contents of the prior application being incorporated herein by reference.

TECHNICAL FIELD

This relates to a program, an information processing method, and an information processing device.

BACKGROUND TECHNOLOGY

There has been known an information processing system that distributes videos including animations of avatar objects based on user movements. This system generates a video containing two characters in real time. In addition, voice actors' voices are combined into videos in real time and distributed over a network.

SUMMARY

Problems to be Resolved

Incidentally, in the information processing system that distributes videos, for the purpose of increasing the number of viewing users, or for the purpose of increasing the cumulative viewing time or the number of times viewed, and the like, it is being considered to increase the opportunities for viewing users to participate in the video being distributed.

However, even if multiple users participate in video distribution as in the above system, the number of participants is limited, and opportunities for viewing users to participate have not increased.

Means of Solving Problems

In an embodiment, a program is provided that is executed by an information processing device. The program causes one or more computers to execute (i) a first output control process that outputs to a display a video including a first avatar object to which tracking data showing movement of a first user is applied; and (ii) a second output control process which, when an action of a second user with respect to the video corresponds to a predetermined reference action, displays in the video, in addition to the first avatar object, within a display period shorter than a display period of the first avatar object, (a) a second avatar object corresponding to the second user, a rendering (drawing) processing load of the second avatar object being smaller than that of the first avatar object, and (b) information corresponding to the reference action.

In another embodiment, an information processing method is provided. The information processing method causes one or more computers execute (i) a first output control process that outputs to a display a video including a first avatar object to which tracking data showing movement of a first user is applied; and (ii) a second output control process which, when an action of a second user with respect to the video corresponds to a predetermined reference action, displays in the video, in addition to the first avatar object, within a display period shorter than a display period of the first avatar object, (a) a second avatar object corresponding to the second user, a rendering processing load of the second avatar object being smaller than that of the first avatar object, and (b) information corresponding to the reference action.

In another embodiment, an information processing device is provided. The information processing device is provided with (i) a first processor that causes a video including a first avatar object to which tracking data showing movement of a first user is applied to be output to a display of a second user device used by a second user based on a video viewing request from the second user device; (ii) a second processor that acquires, from the second user device, information corresponding to a predetermined reference action that is an action of the second user with respect to the video; (iii) a third processor that acquires, from the second user device, data for rendering a second avatar object corresponding to the second user, the data for rendering the second avatar object having a rendering processing load smaller than that of the first avatar object; and (iv) a fourth processor that, when the action of the second user with respect to the video corresponds to the reference action, causes to be displayed in the video, in addition to the first avatar object, within a display period shorter than the display period of the first avatar object, (a) the second avatar object and (b) information corresponding to the reference action.

In another embodiment, an information processing method is provided. The information processing method causes one or more computers to execute (i) a first process that causes a video including a first avatar object to which tracking data showing movement of a first user is applied to be output to a display of a second user device used by a second user based on a video viewing request from the second user device; (ii) a second process that acquires, from the second user device, information corresponding to a predetermined reference action that is an action of the second user with respect to the video; (iii) a third process that acquires, from the second user device, data for rendering a second avatar object corresponding to the second user, the data for rendering the second avatar object having a rendering processing load smaller than that of the first avatar object; and (iv) a fourth process that, when the action of the second user with respect to the video corresponds to the reference action, causes to be displayed in the video, in addition to the first avatar object, within a display period shorter than the display period of the first avatar object, (a) the second avatar object and (b) information corresponding to the reference action.

Effects

The embodiments disclosed herein can increase opportunities for viewing users who watch videos to participate in video distribution while reducing the processing load of rendering.

BRIEF EXPLANATION OF DRAWINGS

FIG. 2 is a diagram showing user management data of the same embodiment.

FIG. 3 is a diagram showing body parts data of the same embodiment.

FIG. 4 is a diagram showing attached parts data of the same embodiment.

FIG. 12 is a diagram showing a viewing screen of the same embodiment.

DETAILED DESCRIPTION OF EMBODIMENTS

First Embodiment

Hereinafter, a program, an information processing method, and an information processing device of a first embodiment will be explained.
<Information Processing System>

Figure 1:
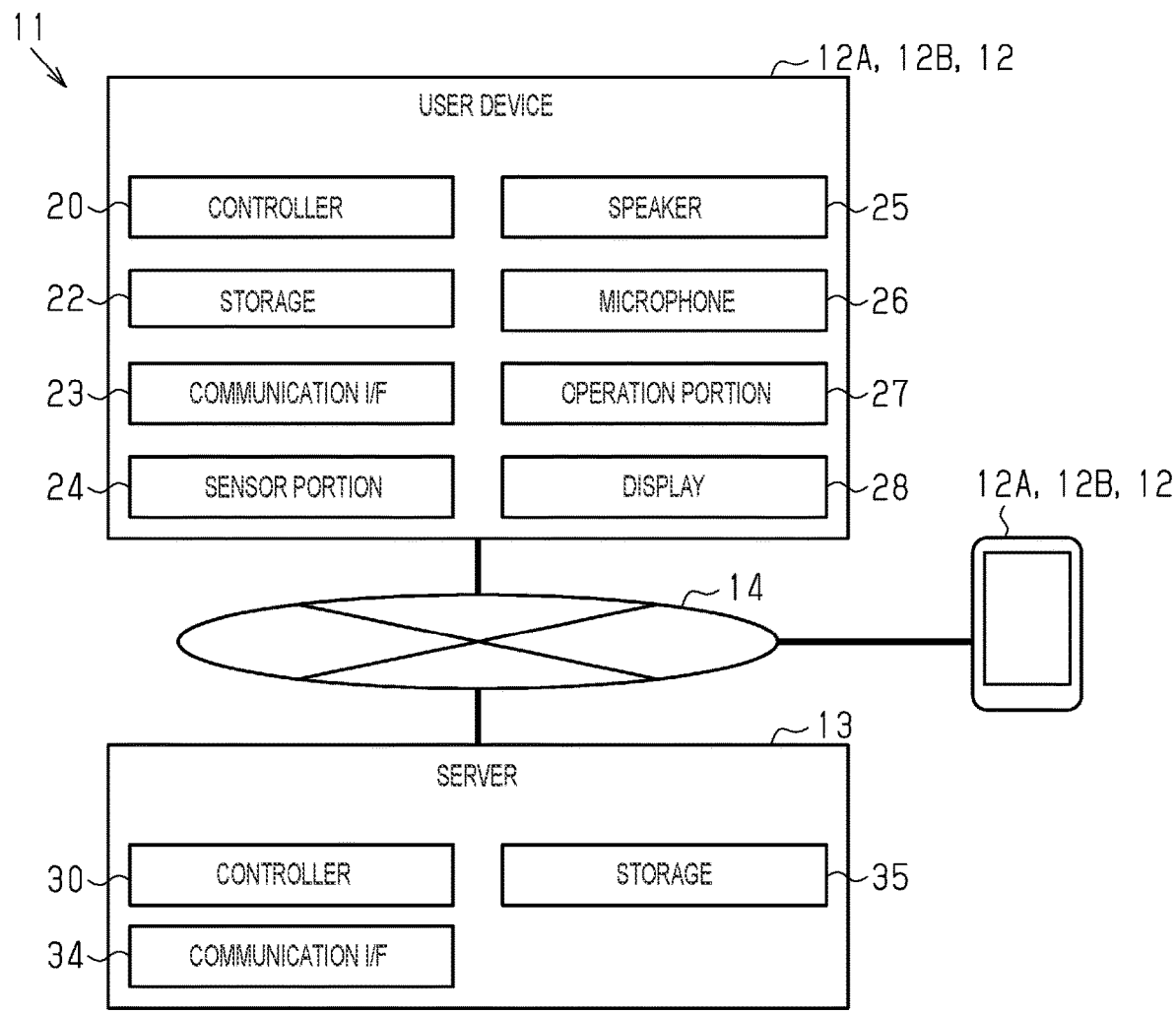
FIG. 1 is schematic view showing an embodiment of an information processing system in a first embodiment.

An information processing system 11 will be described with reference to FIG. 1. The information processing system 11 includes a plurality of user devices 12 and a server 13. The user devices 12 and the server 13 send and receive data via a network 14. Based on an input operation of a user, the user device 12 receives, from the server 13, data necessary for distributing and viewing a video.

A user who distributes a video using a user device 12 is called a distributing user, and a user who views the distributed video is called a viewing user. A user can be both a distributing user and a viewing user. That is, a user is a viewing user when s/he watches videos and a distributing user when s/he distributes videos. The user device 12 used by the distributing user is referred to as a distributing user device 12A, and the user device 12 used by the viewing user is referred to as a viewing user device 12B. When a distributing user and a viewing user are not distinguished, and when a distributing user device 12A and a viewing user device 12B are not distinguished, they are simply referred to as user and user device 12. The distributing user corresponds to a first user in the scope of the claims, and the viewing user corresponds to a second user in the scope of the claims. The distributing user device 12A corresponds to a first user device, and the viewing user device 12B corresponds to a second user device.

The user device 12 is a smartphone (multifunctional telephone terminal), a tablet terminal, a personal computer, a game console, a wearable computer, or an information processing device other than these devices that is capable of reproducing videos. A wearable computer may be provided with a screen on which a user can watch a video, and is, for example, a head-mounted display worn on the user's head, a glasses-type wearable terminal, or the like. The user device 12 may be a device that operates independently, or may be composed of a plurality of devices that are connected to each other so as to be able to send and receive various data. As an example of the latter user device 12, there is, for example, a system that performs outside-in tracking.

The user device 12 includes a controller 20, a storage 22 (memory medium), and a communication interface (I/F) 23. The controller 20 includes one or a plurality of arithmetic circuits such as a CPU (Central Processing Unit), a GPU (Graphics Processing Unit), an NPU (Neural network Processing Unit) or the like. Further, the controller 20 includes a memory which is a main memory device (memory medium) on which the arithmetic circuit can read and write. The memory is composed of a semiconductor memory or the like. The controller 20 reads the operating system and other programs from the storage 22 or an external storage into the memory, and executes instructions retrieved from the memory. The communication I/F 23 can send data to and receive data from the server 13 and other user devices 12 via the network 14. The network 14 includes various networks such as a local area network, the Internet, or the like. The storage 22 corresponds to storage in the scope of the claims.

The storage 22 is an auxiliary memory device (memory medium), and is, for example, a memory medium such as a magnetic disk, an optical disk, a semiconductor memory, or the like. For the storage 22, a plurality of storages can also be used in combination.

The controller 20 executes various processes related to video distribution and various processes related to viewing by executing various programs stored in the storage 22, based on the user's input operation to an operation portion 27. Hereinafter, for convenience of explanation, a state in which a video is distributed is referred to as a distribution mode, and a state in which a video distributed by another distributing user is viewed is referred to as a viewing mode.

Further, the user device 12 includes a sensor portion 24, a speaker 25, a microphone 26, the operation portion 27 as an input operation portion, and a display 28. At least one of the sensor portion 24, the speaker 25, the microphone 26, the operation portion 27, and the display 28 may be provided within the same device as the controller 20, or may be provided in a state of being connected to the controller 20.

The sensor portion 24 is one or a plurality of sensors that detect a facial motion indicating a change in the facial expression of the user and a body motion indicating a change in the relative position of the user's body with respect to the sensor portion 24. Facial motion includes movements such as blinking and opening and closing of the mouth. A known device can be used as the sensor portion 24. Examples of the sensor portion 24 include a ToF sensor that measures and detects the time of flight until light emitted toward the user is reflected on the user's face and returns, a camera that captures the user's face, and an image processor that processes data captured by the camera. Further, the sensor portion 24 may include an RGB camera that captures visible light and a near-infrared camera that captures near-infrared rays. For the RGB camera and the near-infrared camera, for example, "True Depth" on the "iPhone X (registered trademark)" or "LIDAR" (Light Detection and Ranging, or Laser Imaging Detection and Ranging) on the "iPad Pro (registered trademark)" or the like, or other ToF sensors mounted on smartphones, can be used. Specifically, this camera projects tens of thousands of invisible dots (points) on the user's face or the like by a dot projector. Then, the reflected light of the dot pattern is detected and analyzed, a depth map of the face is formed and an infrared image of the face or the like is captured to capture accurate face data. The arithmetic processor of the sensor portion 24 generates various items of information based on the depth map and the infrared image, compares the information with registered reference data, and calculates the depth of each point of the face (the distance between each point and the near-infrared camera) and deviations in positions other than depth.

Further, the sensor portion 24 may have a function of tracking not only the user's face but also the hands (hand tracking). Further, the sensor portion 24 may include a sensor that detects the position or orientation of a human body part other than the hands. The sensor portion 24 may further include a sensor such as an acceleration sensor that detects speed and/or acceleration, and a sensor such as a gyro sensor that detects direction and/or orientation. The sensor portion 24 may have a spatial mapping function that recognizes an object in the real space in which the user exists based on the detection results of the ToF sensor and/or other known sensors, and maps the recognized object to a spatial map. Hereinafter, when the facial motion detection data and the body motion detection data are described without particular distinction, such will be simply referred to as "tracking data." The image processor of the sensor portion 24 may be provided by the controller 20.

The speaker 25 converts voice data into voice and outputs such. The microphone 26 inputs voice spoken by the user and converts such into voice data. The display 28 outputs various images in response to output instructions from the controller 20.

As the operation portion 27, a device corresponding to the type of user device 12 can be used. An example of the operation portion 27 is a touch panel integrated with the display 28. Further, other examples of the operation portion 27 are an operation button provided in the housing of the user device 12, a keyboard, a mouse, a controller the user operates by hand, or the like. The controller may incorporate various known sensors such as an inertial measurement sensor (IMU: Inertial Measurement Unit) such as an acceleration sensor or a gyro or the like. Further, another example of the operation portion 27 may be a tracking device that specifies the movement of the user's hands, the movement of the eyes, the movement of the head, the direction of the line of sight, and the like. In this embodiment, for example, the user's instructions may be determined based on the movement of the user's hands, and video distribution can be started or stopped, or various operations can be executed such as the display of a message, an evaluation of the video, or the display of a predetermined object (for example, the below-described gift). If the sensor portion 24 also has an input interface function such as a hand tracking function, the operation portion 27 can be omitted.

<Server>

Next, the server 13 will be described. The server 13 is used by a service provider or the like that provides a service for distributing videos. The server 13 includes a controller 30, a communication I/F 34, and a storage 35. The controller 30 has one or a plurality of arithmetic circuits. The controller 30 has the same configuration as the controller 20 of the user device 12. Further, the communication I/F 34 and the storage 35 have the same configurations as in the user device 12. The server 13 may be composed of one device or may be composed of a plurality of devices. When the server 13 is composed of a plurality of devices, those devices provide the functions of the controller 30 and various data stored in the storage 35 in a distributed manner. The controller 30 corresponds to the first processor, the second processor, the third processor, and the fourth processor in the scope of the claims.

(Video Distribution Method)

As the video distribution method, one among a client rendering method, a browser rendering method, a video distribution method, and a server distribution method can be used.

In the client rendering method, the distributing user device 12A and the viewing user device 12B receive video composition data necessary to generate a video from the server 13, and draw the video. The video composition data includes tracking data detected by the sensor portion 24 of the distributing user device 12A. In addition, each user device 12 acquires voice data that is based on the speech of the distributing user and outputs voice in synchronization with the video. In this case, the storage 22 of each user device 12 stores an application program and various data such as rendering data to draw an avatar.

The browser rendering method is a method in which the distributing user device 12A and the viewing user device 12B draw a video using a web browser program stored in the storage 22. At this time, the distributing user device 12A sends tracking data and the like to the server 13. The user device 12 downloads from the server 13 a web page that is described in a markup language such as HTML (Hyper Text Markup Language), and which uses CSS (Cascading Style Sheets), Javascript (registered trademark), or the like. The web browser program activated by the user device 12 draws an avatar object and other objects by Javascript running on the browser. In the browser rendering method, the user device 12 stores the data received from the server 13 in volatile memory, and stores the URL of the web page for displaying the video and the like in non-volatile memory. Therefore, the rendering data of the avatar object is not stored in the user device 12.

The video distribution method is a method in which the distributing user device 12A generates video data. The viewing user device 12B displays a video on the display 28 based on the video data received from the distributing user device 12A. Specifically, the distributing user device 12A generates the video data using tracking data and the like. The distributing user device 12A also sends, to the server 13, encoded video data and voice data. The server 13 sends, to the viewing user device 12B, the video data and the voice data.

The server distribution method is a method in which the server 13 generates video data. The server 13 receives tracking data and voice data from the distributing user device 12A. The server 13 then generates video data based on those data. The server 13 sends the generated video data to the distributing user device 12A and the viewing user device 12B. The distributing user device 12A and the viewing user device 12B output a video to the display 28, based on the received video data.

Thus, either a user device 12 or the server 13 is responsible for generating video data. The device responsible for generating the video data can be changed according to the distribution method. When a user device 12 is responsible for generating video data, the viewing user device 12B may generate the video data, or the distributing user device 12A may generate the video data. Additionally, as needed, the user device 12 sends the generated video data to other user devices 12 as a destination.

The distributing user device 12A and the viewing user device 12B may display the video in different ways from each other. For example, the distributing user device 12A may display the video in the client rendering method, and the viewing user device 12B may display the video in the browser rendering method.

In this embodiment, a method in which each user device 12 distributes a video by the client rendering method will be described.

In the client rendering method, the user device 12 stores a video application program in the storage 22. In addition, the storage 22 stores three-dimensional model data and the like of an avatar object(s) and other objects that are used for executing the video application program.

The controller 20 of the distributing user device 12A sends, to the server 13, video composition data including tracking data acquired from the sensor portion 24 and voice data that is based on the voice collected by the microphone 26. The distributing user can set the parts of the avatar object corresponding to himself/herself to his/her preferred parts. The video composition data contains identification information (part IDs) indicating parts of the avatar object. The distributing user can also adjust a position of a virtual camera in a virtual space. The video composition data may include the position of the virtual camera. The tracking data and voice data are time-stamped. The time stamp is generated based on reference time information that is based on a circuit having a timekeeping function (internal clock) of the controller 20. Alternatively the time stamp is generated based on time information sent from the server 13 or reference time information acquired from the server 13 that provides a time distribution service. The time stamp may represent (i) an elapsed time from the reference time or (ii) a time of day.

The viewing user device 12B receives the part IDs of the avatar object of the distributing user in advance at a predetermined timing, such as when the user starts viewing the video. The viewing user device 12B applies the tracking data to the avatar object of the distributing user. In addition, the controller 20 of the viewing user device 12B performs rendering including the avatar object and objects other than the avatar object. Rendering here refers to a rendering process that includes acquiring the position of the virtual camera, perspective projection, and hidden surface erasure based on depth information associated with each of the objects. Rendering may be at least one of these processes and may include processes, for example, shading, texture mapping, and the like.

The controller 20 receives, from the server 13, data such as posted messages or notifications and the like from viewing users. The controller 20 outputs, to the display 28, video data obtained by combining an image of an avatar object or other object, a posted message, a notification, or the like. In addition, the controller 20 synchronizes the voice data with the video data based on the time stamp and outputs the voice data from the speaker 25.

Further, based on the viewing user's operation, the controller 20 performs sending of gift object display requests, posting of messages related to the video, and evaluation of the video (selection of a "like" button or a "favorite" button, or the like).

<Configuration of Data Used for Videos>

Next, with reference to FIGS. 2 to 4, various data used for video distribution or viewing will be described in detail.

FIG. 2 shows an example of user management data 50. The user management data 50 is stored in the server 13 and includes data of user IDs, which are user identification information, coins, and points. Coins are media that can be purchased by a user. Points are media that can be acquired by actions such as viewing and distributing videos. Besides this, the management data 50 may include scores accumulated by participating in events. Coins, points, and scores can be used within the video distribution service. The user device 12 may store the user management data 50.

FIG. 3 is an example of body parts data 51 of an avatar object. The body parts data 51 is stored in the storage 22 of the user device 12.

The main body parts will be described. A body part is a part that constitutes a part of an avatar object. The data for rendering body parts includes polygon data, skeleton data (bone) for expressing the movements of the avatar object, texture data, and the like. Also, body parts are associated with avatar attributes. The avatar attributes include, for example, a model type, that is, a male type such as "M type" and a female type such as "F type," height, skin color, body type, and the like. Skeleton data, polygon data, and the like of avatar objects differ depending on avatar attributes. By selecting avatar attributes, the user selects body parts such as upper and lower body. Some of these body parts can be set arbitrarily by the user. For example, the user can select parts such as eyes, mouth, hairstyle, and the like. In this embodiment, each user can register three avatar objects as avatars available to the user.

The body parts data 51 contains information related to the avatar's slot number, model type, height, skin color, body type, and other body parts. The body parts data 51 has various types of information for each avatar slot number. The model type is the model type selected by the user, which is an avatar attribute. Height, skin color, and body type are identification information of the height, skin color, and body type selected by the user. Prior to the user's selection, the height, skin color, and body type are left at their initial settings. The user can change the settings for height, skin color, and body type. Parts are the IDs of individual parts such as eyes, mouth, and hairstyle. Among a plurality of attached parts, there is an attached part whose color can be selected. For example, the "T-shirt" attached part has the colors "red," "blue," and "green" that can be selected. Before the user selects a body part, the body part at the initial setting is applied.

FIG. 4 shows an example of the attached parts data 52. The attached parts will be described. The attached parts are parts that are applied to predetermined parts of the avatar object. The attached parts are, for example, "tops" applied to the upper body, "shoes" applied to the feet, "skirts" applied to the lower body, and the like. The user can select his/her favorite attached parts from a plurality of attached parts according to the avatar attributes of the avatar object. That is, the viewing user can apply attached parts to each avatar object with slot numbers "1" to "3." Before the user selects an attached part, an attached part at the initial setting is being applied.

Attribute data indicating the part of the avatar object is associated with the attached parts. Attached parts can be associated with a predetermined part of the avatar object, and in addition to the avatar object's clothing, a "cup," a "mug," an "umbrella," a "musical instrument," or the like may also be used. For example, a "cup" is associated with the hand part of the avatar object. The "cup" part can be applied to the hand to display the avatar object holding a "cup." The attached parts include (i) standard parts that are stored when the application program is installed, and (ii) parts that are given by server 13 when the user redeems coins or participates in events, and the like.

The attached parts data 52 includes part IDs, item names, parts, attributes, colors, and slot numbers of the avatar objects to which the attached parts are to be applied. The part IDs are identification information (IDs) of the selected attached parts. The item names are the names of the attached parts. For example, item names such as "beginner's T-shirt" are stored. The parts are the parts of the avatar objects to which the attached parts are applied. The attributes are the attributes of the avatars to which the attached parts are applied, and all attributes (for example, "All"), "M type," or "F type" are set. The colors are the colors of the attached parts and indicate the colors selected by the user. The applied slot numbers indicate the slot numbers of the avatar objects to which the attached parts are applied, among the avatar objects registered by the user.

The user device 12 may store non-attached parts data in addition to the attached parts data 52. A non-attached part is a part other than an attached part applied to the virtual space. For example, the non-attached part is an object such as wallpaper displayed as a background. The non-attached parts data includes a part ID, item name, and color for each part. The non-attached parts may be stored in association with the applicable avatar object.

<Collaborative Distribution Function>

Next, the collaborative distribution function (collaboration function) will be described. In collaborative distribution, a user other than the distributing user can display his/her own avatar object as a co-star in the video being distributed. Co-starring in collaborative distribution can only be performed with videos that have been set to permit collaborative distribution by the distributing user. In other words, a user permitted by the distributing user can become a co-star. In collaborative distribution, in addition to the distributing user, one or more co-starring users up to a predetermined number can participate. The predetermined number of people is, for example, three. An avatar object 110 of the distributing user corresponds to the first avatar object in the scope of the claims.

In participating in the collaborative distribution, the user device 12 sends a participation request to the distributing user device 12A. When the distributing user approves the participation request, the distributing user becomes the host user and the user who made the participation request becomes the guest user in the collaborative distribution. Then a host avatar object corresponding to the host user, and a guest avatar object corresponding to the guest user are displayed in the video.

Figure 5:
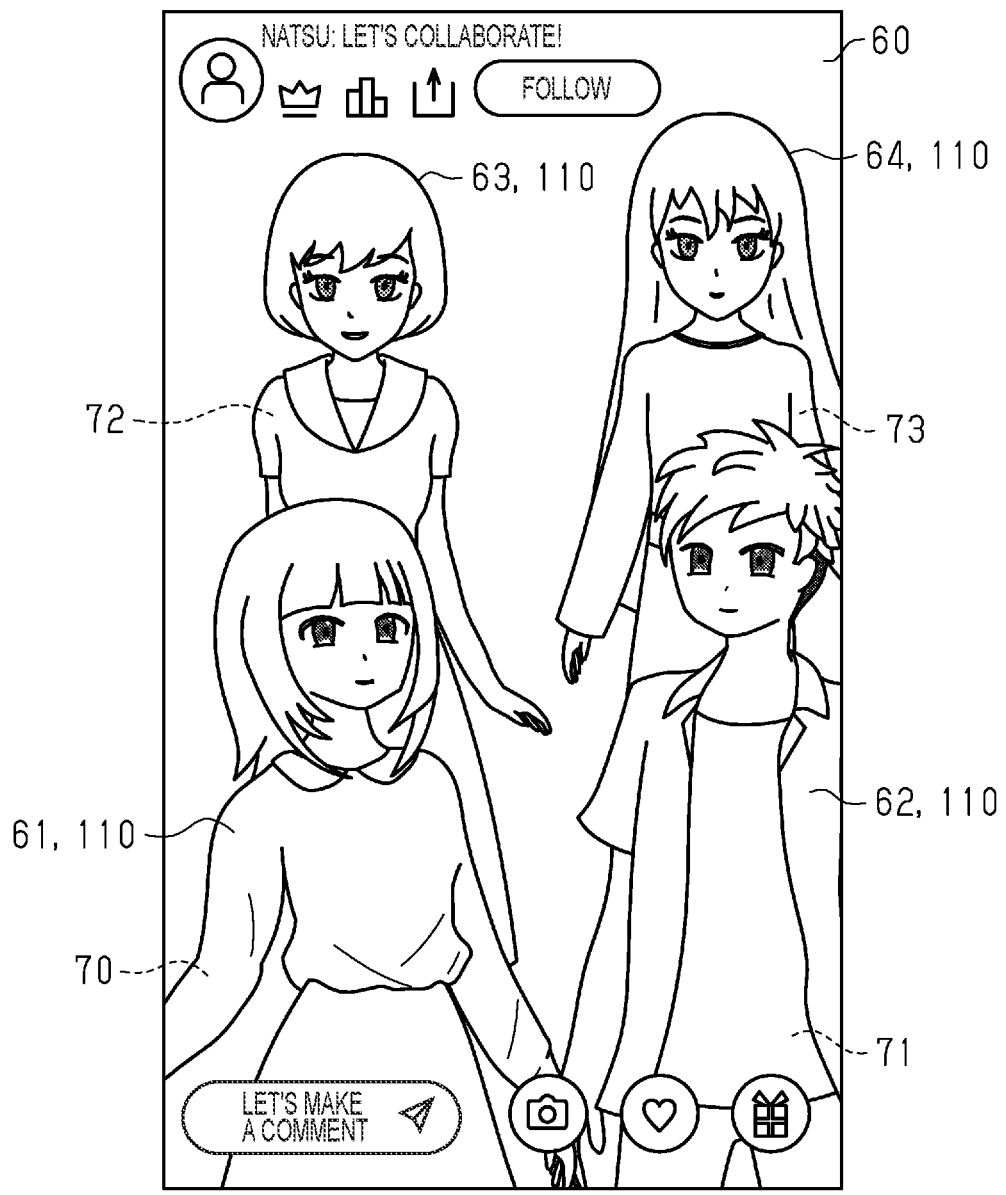
FIG. 5 is a diagram showing a viewing screen of collaborative distribution of the same embodiment.

FIG. 5 shows a viewing screen 60 for collaborative distribution. This viewing screen 60 is displayed on the display 28 of the viewing user device 12B. A substantially similar screen is also displayed on the distributing user device 12A.

The viewing screen 60 includes an image of a host avatar object 61. The viewing screen 60 shown in FIG. 5 shows an example in which the host avatar object 61 and guest avatar objects 62 to 64 of three guest users are displayed. The guest avatar object 62 corresponds to a third avatar object.

A first guest avatar object 62 is an avatar object corresponding to a first guest user. The guest avatar object 62 is displayed at a position 71 to the right of a position 70 of the host avatar object 61. The host avatar object 61 and the guest avatar object 62 are drawn using three-dimensional model data. Also, tracking data in which the movements of the host user have been detected is applied to the host avatar object 61. That is, the host avatar object 61 moves according to the host user's body movements. Tracking data in which the movements of the first guest user have been detected is applied to the guest avatar object 62. That is, the guest avatar object 62 moves according to the movements of the body of the first guest user. The guest avatar object 62 to which the tracking data is applied is called a second avatar object.

A guest avatar object 63 of a second guest user whose participation request is approved next after the first guest user is displayed at a position 72 at a left side behind the host avatar object 61 and the guest avatar object 62. A guest avatar object 64 of the third guest user whose participation request is approved next after the second guest user is displayed at a position 73 at a rear right side. The guest avatar objects 63 and 64 are drawn using three-dimensional model data. Tracking data in which the movements of the second guest user have been detected is applied to the guest avatar object 63. Tracking data in which the movements of the third guest user have been detected is applied to the guest avatar object 64.

The guest avatar object 62 leaves by operation of the first guest user. Alternatively, the guest avatar object 62 may automatically leave the position 71 when a predetermined time has passed since the guest avatar object 62 started being displayed. Then the guest avatar object 63 of the second guest user is placed at the position 71. Also, the guest avatar object 64 of the third guest user is placed at the position 72. Furthermore, if there is a new guest avatar object waiting to co-star, that avatar object is displayed at a position 73. If there are only guest avatar objects 62 and 63 of the two co-stars in the four-person permissible frame and there is no guest user waiting, these guest avatar objects 62 and 63 may continue to be displayed.

<Display Function of Simple Avatar Object>

Next, a display function of an avatar object 110 corresponding to the viewing user will be described. An avatar object 110 with a small rendering (drawing) processing load and corresponding to the viewing user is hereinafter referred to as a simple avatar object. Image data of the simple avatar object is generated in advance by the controller 20 of the user device 12. The simple avatar object is an avatar object of the slot number selected by the viewing user corresponding to the simple avatar object. The attached parts selected by the viewing user are applied to this avatar object. In other words, this avatar object is generated based on the main body parts and attached parts that constitute the three-dimensional avatar object 110 used for distributing the video. Also, the image data of the generated simple avatar object is stored in the storage 22 of the user device 12. Additionally, the image data of the simple avatar object may be generated by the server 13.

A simple avatar object is data whose rendering processing load is reduced. The simple avatar object has its processing load reduced by using at least one technique among the following: rendering as a two-dimensional object, not applying tracking data, and reducing the number of polygons. Furthermore, in order to reduce the processing load on the user device 12, the image data of the simple avatar object may be data in which a plurality of parts are integrated into one. Also, simple avatar objects may omit components that perform physical behavior. Additionally, the size of the simple avatar object on the screen is smaller than the sizes of the images of the host avatar object 61 and the guest avatar objects 62-64.

In this embodiment, the simple avatar object is drawn as a two-dimensional object. Also, tracking data is not applied to the simple avatar object.

In addition, the display of the simple avatar object does not require permission from the distributing user. It is displayed when the viewing user executes a predetermined reference action. That is, if the distributing user performs an operation that permits or does not permit the display of the simple avatar object every time the reference action is executed while a video is being distributed, the operation of the distributing user becomes complicated. Therefore, the simple avatar object is displayed without permission from the distributing user. Also, since tracking data is not applied to the simple avatar object, a viewing user is less likely to perform a nuisance action in the video. Therefore, there is little need for the distributing user to give permission for displaying simple avatar objects.

Also, the simple avatar object is arranged in an area for displaying a GUI (Graphical User Interface). Hereinafter, this area will be referred to as a UI display area. The GUI placed in the UI display area is displayed in front in a three-dimensional virtual space.

Since the simple avatar object is displayed in the UI display area, depth information (Z value, position in a screen depth direction) is not associated with the virtual camera set in the virtual space. The depth information indicates the distance from the virtual camera displaying the screen. Objects farther from the virtual camera have greater depth. For this reason, when rendering a simple avatar object, a depth test (hidden surface erasure) does not need to be performed in rendering with other three-dimensional objects. In a depth test, it is determined whether one object is in front of another object or behind the other object, and if it is behind the other object, the non-hidden area of the one object is drawn, and the hidden area is not drawn. One technique for depth test is, for example, the Z-test (Z-buffering). The depth test needs to be performed for the guest avatar objects 62-64, but simple avatar objects are not associated with depth information, so they do not need to be depth tested. For this reason, the processing load for rendering the simple avatar objects can be less than the processing load for rendering the guest avatar objects 62-64.

A simple avatar object is displayed on the display 28 of the user device 12 when the viewing user performs the following reference actions:

when viewing a video is started.
when a video is evaluated.
when a message is posted.
when a gift display request is sent.

When the viewing user device 12B accepts an instruction operation of a reference action from the viewing user, it sends, to the server 13, various data associated with the executed reference action and the image data of the simple avatar object. At this time, instead of the image data, the part IDs of the body parts and the attached parts for displaying the simple avatar object may be sent. The viewing user device 12B may also send, to the server 13, the image data or part IDs of the simple avatar object in advance before accepting the instruction operation for the reference action.

The server 13 sends, to the distributing user device 12A and a plurality of the viewing user devices 12B, (i) the data corresponding to the reference action and (ii) a request to display the data corresponding to the reference action. A viewing user device 12B at a destination may or may not include the viewing user device 12B that has sent image data and the like of the simple avatar object. If the viewing user device 12B at the destination does not include the viewing user device 12B that has sent the image data and the like of the simple avatar object, the viewing user device 12B displays a screen based on (i) the various data associated with the reference action and (ii) the image data of the simple avatar object.

The distributing user device 12A and the viewing user device(s) 12B receive, from the server 13, various data associated with the executed reference action and the image data of the simple avatar object. Then, in addition to the host avatar object 61, the distributing user device 12A and the viewing user device(s) 12B output, to the displays 28, the simple avatar object and information corresponding to the reference action.

A simple avatar object 80 is displayed in the video for a predetermined time. That is, the period during which the simple avatar object 80 is displayed is shorter than the period during which the avatar object 110 of the distributing user is displayed. Alternatively, the simple avatar object 80 may be deleted from the video based on the operation of the distributing user or the operation of the viewing user corresponding to the simple avatar object 80.

(Operation)

Next, operation of the user device 12 and the server 13 will be explained.

The user device 12 performs a first output control process, a second output control process, and a third output control process.

In the first output control process, the controller 20 outputs, to the display 28, a video including the avatar object 110 to which tracking data representing the movements of the distributing user is applied.

In the second output control process, when the viewing user's action on the video corresponds to a predetermined reference action, in addition to the avatar object 110, the controller 20 adds the simple avatar object and information corresponding to the reference action in the video for a display period shorter than the display period of the avatar object 110. The simple avatar object has a smaller rendering processing load than the first avatar object and corresponds to the viewing user.

In the third output control process, when another user participates in the video as a co-star, the controller 20 outputs, to the display 28, a video including the avatar object 110 of the distributing user and the guest avatar object 62 representing the movements of the co-starring user. The guest avatar object 62 of the co-starring user has applied thereto tracking data representing the movements of the co-starring user.

The server 13 performs a first process, a second process, a third process, and a fourth process.

In the first process, the controller 30 causes the video, including the avatar object 110 to which tracking data representing the movements of the distributing user is applied, to be output to the display 28 of the viewing user device 12B used by the viewing user, based on a request to view the video from the viewing user device 12B.

In the second process, the controller 30 acquires, from the viewing user device 12B, information corresponding to a reference action of the viewing user.

In the third process, the controller 30 acquires, from the viewing user device 12B, data for rendering a simple avatar object corresponding to the viewing user, and for which the rendering processing load is smaller than that of the avatar object 110 of the distributing user.

In the fourth process, if the viewing user's action on the video corresponds to the reference action, in addition to the avatar object 110, the controller 30 causes the simple avatar object and information corresponding to the reference action to be displayed in the video within a display period shorter than the display period of the avatar object 110.

Figure 6:
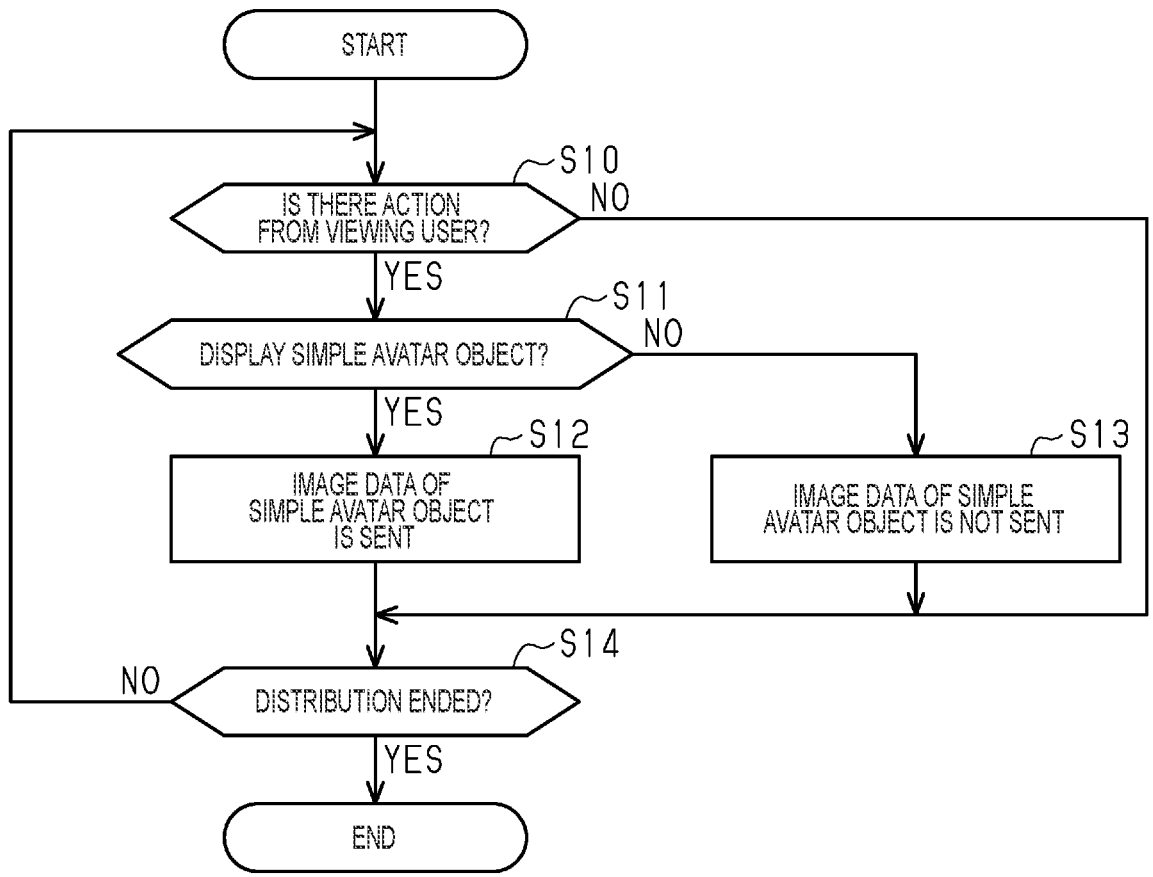
FIG. 6 is a flowchart showing a procedure that displays a simple avatar object of the same embodiment.

Next, with reference to FIG. 6, a detailed description will be given of a procedure for the viewing user device 12B to send the image data of the simple avatar object. It is assumed that the viewing user device 12B has started viewing a video selected by the viewing user.

The controller 20 of the viewing user device 12B determines whether or not an action by the viewing user is detected based on the user's input operation to the operation portion 27 (step S10). If it is determined that there is no action (step S10: NO), the procedure proceeds to step S14.

Meanwhile, if an action of the viewing user is detected (step S10: YES), the controller 20 determines whether or not to display the simple avatar object that is an avatar object of the viewing user. Specifically, the controller 20 determines whether or not the detected action corresponds to the reference action that displays the simple avatar object. A list showing the reference action is stored in advance in the storage 22 or the like.

When it is determined that the simple avatar object is not to be displayed (step S11: NO), the controller 20 performs processing according to the action without sending the image data of the simple avatar object (step S13). Actions that do not correspond to the action of displaying a simple avatar object include following a distributing user, sharing a distributed video, capturing a distributed video (screenshot), ending viewing of a video, and the like.

Meanwhile, when it is determined that the simple avatar object is to be displayed (step S11: YES), the controller 20 sends, to the server 13, image data of the simple avatar object (step S12). For example, the controller 20 sends, to the server 13, (i) a request to reflect a good review in the video when a viewing user gives the good review to the video and (ii) the image data of the simple avatar object. Furthermore, when a viewing user posts a message to a video, the controller 20 sends, to the server 13, data including the content of the message and the image data of the simple avatar object. Additionally, when the viewing user sends a gift display request, the controller 20 sends, to the server 13, the gift display request, the ID of the gift object selected by the viewing user, and the image data of the simple avatar object.

In step S14, the controller 20 determines whether or not the distribution of the video has ended. If it is determined that the video distribution has not ended (step S14: NO), the procedure returns to step S10. If it is determined that the video distribution is to end (step S14: YES), the procedure ends.

(Viewing Screen)

Next, with reference to FIGS. 7-12, screens will be explained that are displayed on the display 28 by the user device 12.

Figure 7:
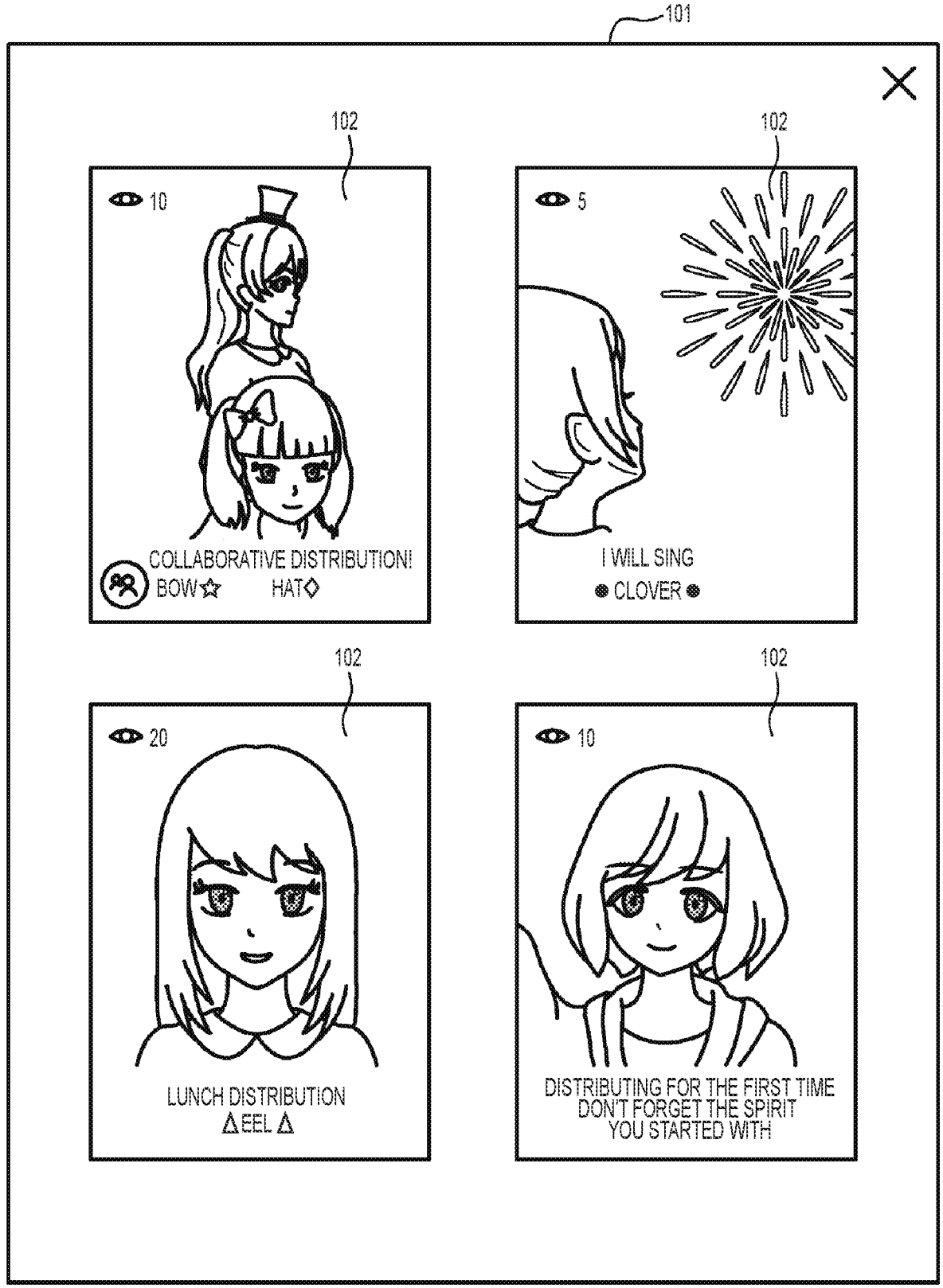
FIG. 7 is a diagram showing a home screen of the same embodiment.

With reference to FIG. 7, a home screen 101 will be explained. When a user activates a video application, the user device 12 receives, from the server 13, a list of videos that are being distributed. The user device 12 outputs the home screen 101 to the display 28 based on the list. On the home screen 101, a video selecting portion 102 is displayed that shows viewable videos. When the user selects the video selecting portion 102, the user device 12 sends, to the server 13, an ID of the selected video along with a viewing request. The server 13 updates the number of viewing users and sends, to the user device 12, (i) video composition data for rendering a video and (ii) voice data. Thereby, the user device 12 is placed in a viewing mode.

When the viewing user device 12B receives video composition data and the like from the server 13, the viewing user device 12B generates video data using the video composition data. Additionally, based on the video data, a viewing screen 100 is output to the display 28.

The viewing screen 100 and the distribution screen displayed on the distributing user device 12A are substantially the same in content of the video including the avatar object 110, except for some exceptions. For this reason, FIGS. 8-12 will explain a display mode of the simple avatar object 80 by exemplifying the viewing screen 100.

Figure 8:
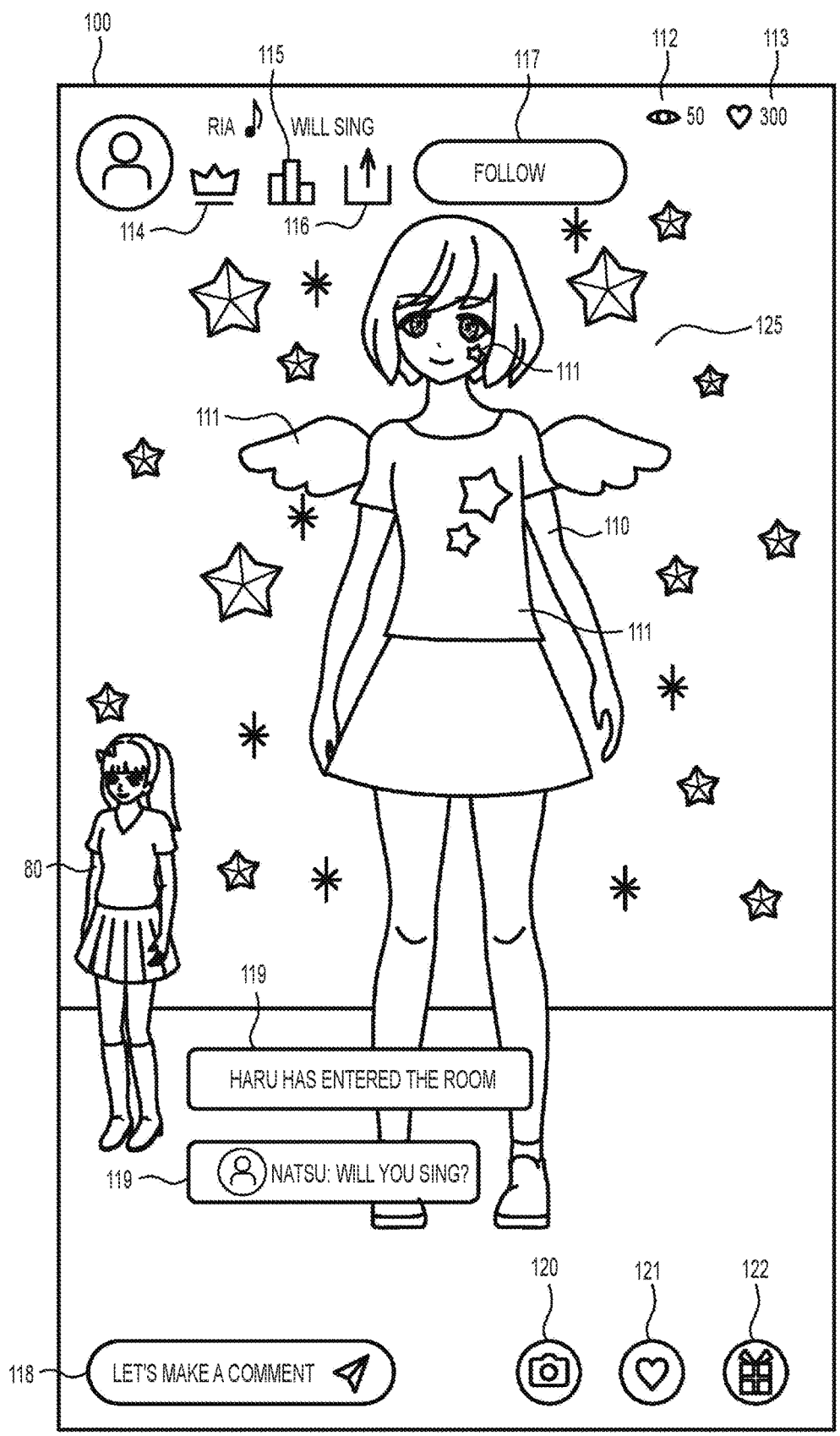
FIG. 8 is a diagram showing a viewing screen of the same embodiment.

FIG. 8 shows an example of the viewing screen 100. The viewing screen 100 includes an image of the avatar object 110 corresponding to the distributing user. The avatar object 110 has applied thereto tracking data that is based on the movement of the distributing user. Rendering data of attached parts 111 is applied to the avatar object 110. In the virtual space, a non-attached part 125 that is wallpaper has been applied. Also, the viewing user device 12B outputs voice from the speaker 25, in synchronization with an animation of the avatar object 110.

Additionally, the viewing screen 100 includes a viewer count 112 and a total heart count 113. The viewer count 112 is the cumulative number of viewers who have viewed the video. Alternatively, viewer count 112 may be the number of viewers currently viewing the video. In addition, the total heart count 113 is the number of times viewers have given a favorable rating since the video was started.

Also, the viewing screen 100 includes a viewing ranking button 114, a distributing user ranking button 115, a share button 116, and a follow button 117. By a viewing user operating the viewing ranking button 114, for viewing users who have viewed the video that is distributed by the distributing user, the viewing user device 12B displays a ranking of the viewing users based on the number of gifts sent. The distributing user ranking button 115 displays a ranking of distributing users that is based on the number of gift objects received among all distributing users who distribute videos. For example, this ranking is calculated for all distributing users. Also, the ranking is the ranking in which the number of received gift objects is arranged in descending order for each type of gift object such as "bouquet."

By the viewing user selecting the share button 116, the viewing user device 12B sends a link (URL) of the video via another social network service, copies the link, reads a follow list of users who follow each other, or the like. By the viewing user selecting the follow button 117, the server 13 associates this viewing user with the distributing user who distributes this video.

Also, the viewing screen 100 includes a message input portion 118 and message display portions 119. The message input portion 118 is an input form that allows the viewing user to send a message to the distributing user. Each of the message display portions 119 is a message sent by a respective viewing user device 12B, or a standardized message sent by the server 13 based on a movement of the viewing user. The message display portions 119 are displayed so that the latest one is the highest (or lowest), and moves downward (or upward) when a new message display portion 119 is added, and is erased when it reaches the bottom (or top) of the displayable area of the message display portion 119.

Additionally, the viewing screen 100 also includes a camera button 120, a good review button 121, and a gift button 122. When the camera button 120 is selected and operated, the viewing user device 12B captures the viewing screen 100 that is being displayed. Additionally, the captured viewing screen 100 is stored in the storage 22. When the good review button 121 is selected and operated, the viewing user device 12B displays, on the viewing screen 100, an indicator indicating a good review, such as a heart mark. Also, the viewing user device 12B sends a request to reflect the good review to the server 13. The server 13 updates the total hearts count 113 when it receives the request to reflect the good review. The viewing user can display the indicator of a good review in the video without paying any price.

When the gift button 122 is selected and operated, the viewing user device 12B superimposes a list of gifts on the viewing screen 100 and displays it. The viewing user using the viewing user device 12B selects a gift from the list of gifts. The viewing user device 12B sends, from the server 13, a gift ID of the selected gift and a gift display request. Furthermore, when the viewing user device 12B receives the gift ID and the gift display request, it draws the gift object corresponding to the gift ID along with the avatar object 110. The viewing user pays the price and displays the gift object in the video. The prices that can be paid for gift objects are coins and points. Since coins are purchased by the user as described above, gift objects for which coins are paid are paid objects. Points can be earned by the user based on his/her actions relating to the video. Therefore, gift objects for which points are paid are free objects.

As described before, the viewing user device 12B displays the simple avatar object 80 when the action of the viewing user using the viewing user device 12B corresponds to a reference action. The viewing user device 12B performs a process of generating image data of the simple avatar object 80 at a timing such as when the video application program is activated or when the viewing of the video is started. Specifically, the part ID or image data of the avatar object 110 selected by that viewing user from among the avatar objects 110 with slot numbers "1" to "3" is acquired. The image data of the avatar object 110 that is acquired at this time has the attached parts 111 that were applied in advance by that viewing user. That is, since the viewing user's own simple avatar object 80 is displayed in the video, it is possible for the viewing user to adapt the attached parts that are applied to the simple avatar object 80 to match the distributing user, to match the season in the real world, or the like.

Then, the controller 20 performs lightening of the image data. As described above, for example, the viewing user device 12B two-dimensionalizes the image data of the avatar object 110 and also makes the simple avatar object 80 smaller than the size of the avatar object 110. The viewing user device 12B generates the image data of the simple avatar object 80 and stores it in the storage 22. Then, when the viewing user using the viewing user device 12B performs the reference action, the image data of the simple avatar object 80 is read from the storage 22 and sent to the server 13.

The process of generating image data of the simple avatar object 80 may be performed by the server 13. In this case, the server 13 receives the IDs of the body parts and the IDs of the attached parts from the viewing user device 12B, and generates the image data of the simple avatar object 80 based on these IDs. Alternatively, the process of generating the image data of the simple avatar object 80 may be such that the image data of the simple avatar object 80 is generated when each viewing user device 12B draws the viewing screen 100. In this case, the viewing user device(s) 12B receives, via the server 13, the IDs of the main body part and the IDs of the attached part from the viewing user device 12B of the viewing user who performed the action, and generates the image data of the simple avatar object 80 based on these IDs.

The viewing screen 100 shown in FIG. 8 shows the simple avatar object 80 of a viewing user that started viewing the video. When another viewing user has started viewing, the viewing user device 12B receives from the server 13 image data of the simple avatar object 80 corresponding to the other viewing user, and displays the simple avatar object 80. Additionally, when the viewing user using the viewing user device 12b starts viewing the video, the viewing user device 12B sends to the server 13 the image data of the simple avatar object 80. Furthermore, the image of the simple avatar object 80 read from the storage 22 is displayed on the display 28, or the image of the simple avatar object 80 is displayed based on the image data of the simple avatar object 80 received from server 13.

Because the viewing screen 100 has limited display space, it is difficult to lay out a large number of simple avatar objects 80. Therefore, the viewing user device 12B displays one simple avatar object 80 at a time. At this time, the image of the simple avatar object 80 is displayed in such a way that it can be distinguished that it is associated with the message display portion 119, such as "XXX entered the room." In the example in FIG. 8, the image is displayed outside of the message display portion 119 and at the same position as the message display portion 119 in a vertical direction of the viewing screen 100.

For example, the viewing user device 12B displays the simple avatar object 80 based on the order in which the image data of simple avatar object 80 is received from the server 13. The viewing user device 12B outputs the image of the simple avatar object 80 at the same timing as the message display portion 119 indicating that viewing of the video has started. Additionally, the viewing user device 12B makes the image of the simple avatar object 80 adjacent to the message display 119 and displays it for a certain period of time. The viewing user device 12B may erase the image of the simple avatar object 80 before the message display portion(s) 119 is erased. In this way, the message display portion 119 can be viewed while still providing display space for another simple avatar object 80. Alternatively, the image of the simple avatar object 80 may be erased at the same time as the message display portion 119.

Figure 9:
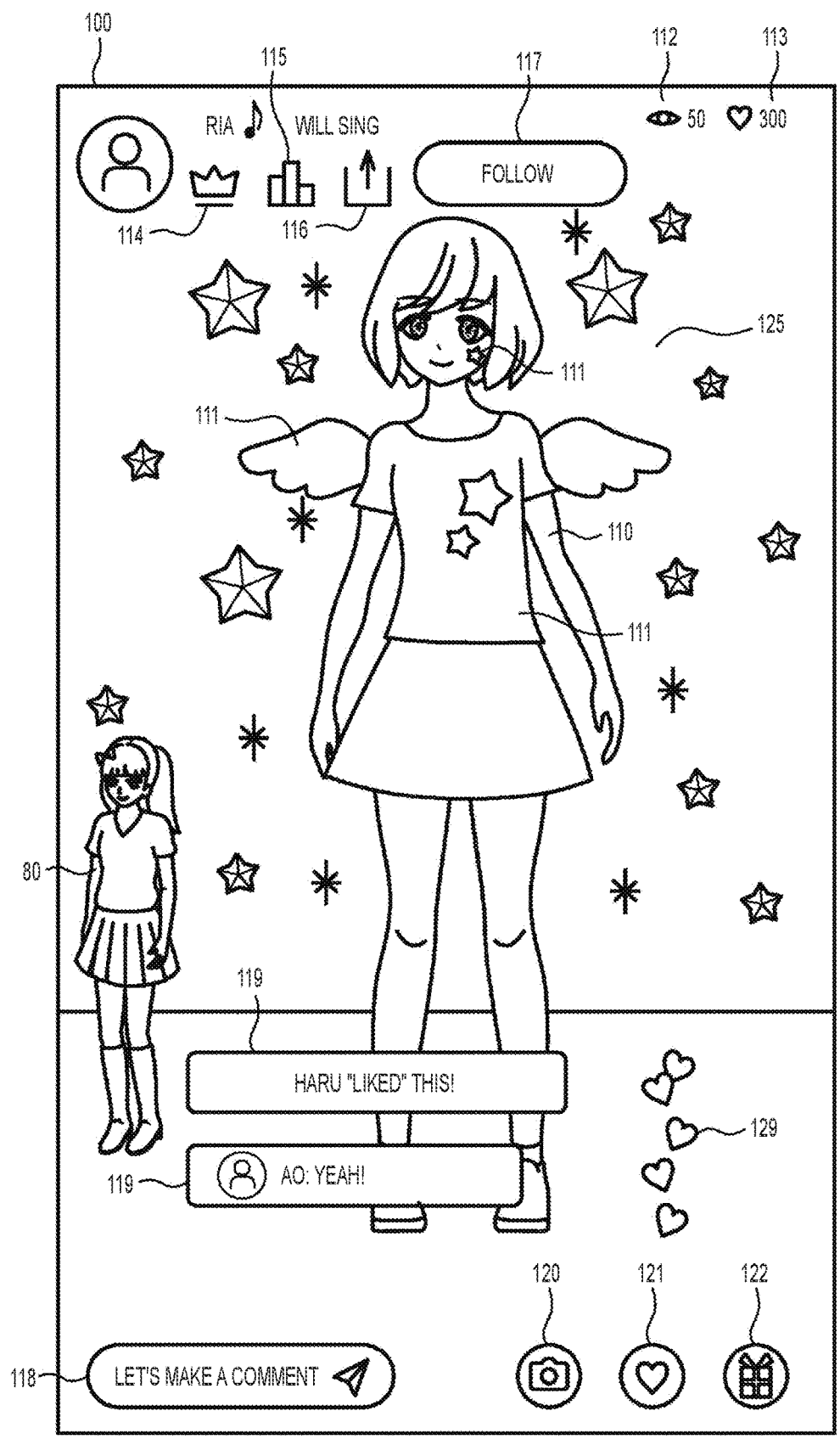
FIG. 9 is a diagram showing a viewing screen of the same embodiment.

In the viewing screen 100 shown in FIG. 9, the simple avatar object 80 of a viewing user who gave a good review to the video is displayed. When the viewing user device 12B receives a request from the server 13 to display an indicator 129 indicating the good review and the image data of the simple avatar object 80, it displays the indicator 129 and the image of the simple avatar object 80 based on these requests. Additionally, when the viewing user using the viewing user device 12B performs an operation to give a good review for the video, the viewing user device 12B sends the image data of the simple avatar object 80 to the server 13 with a request to display the indicator 129.

The viewing user device 12B displays the image of the simple avatar object 80 at the same timing as the message display portion 119 indicating that a good review has been provided. The viewing user device 12B also makes the image of the simple avatar object 80 adjacent to the message display 119 indicating that a good review has been provided and displays the simple avatar object 80 for a certain period of time.

Figure 10:
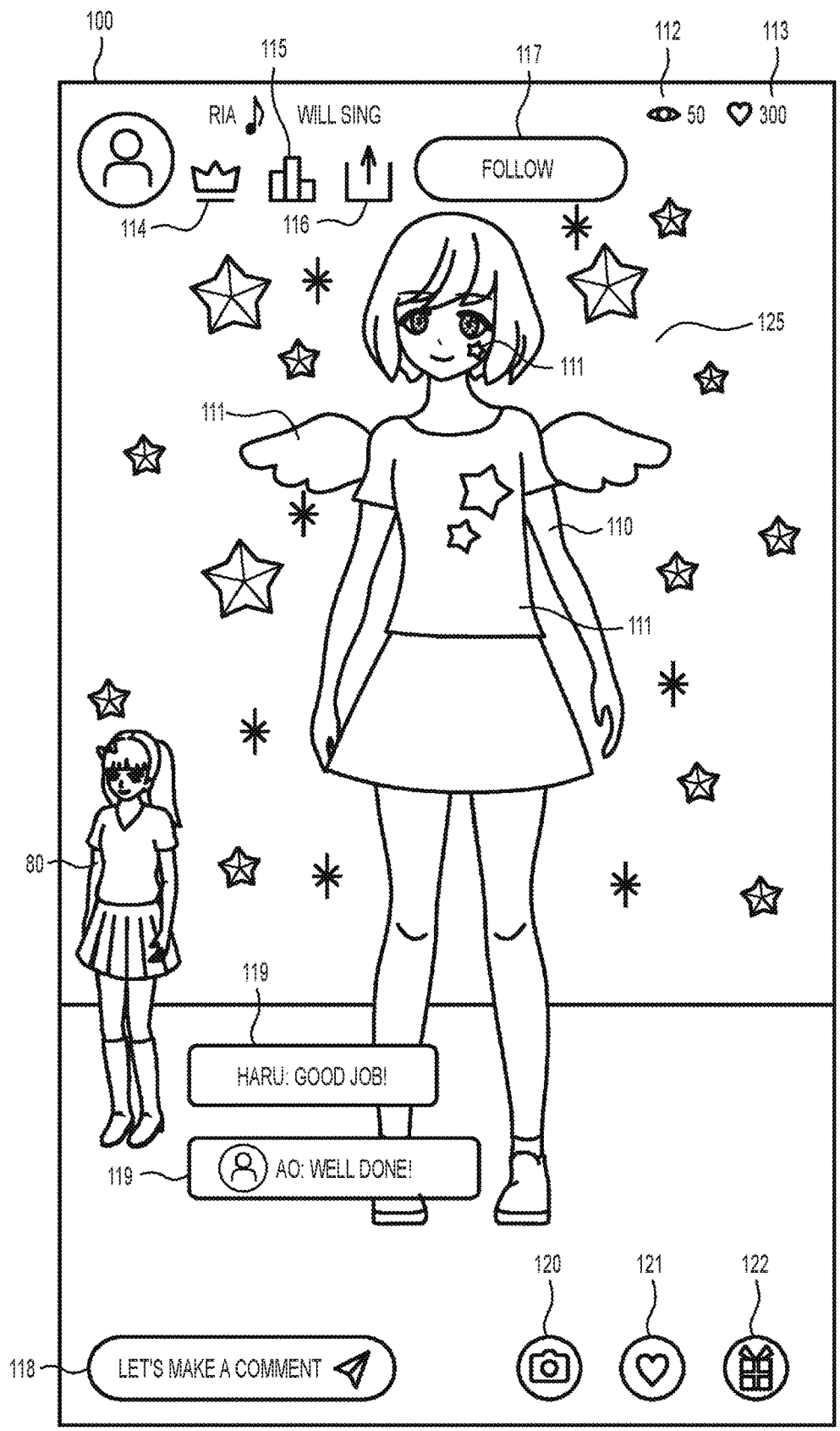
FIG. 10 is a diagram showing a viewing screen of the same embodiment.

In the viewing screen 100 shown in FIG. 10, the simple avatar object 80 of a viewing user who posted a message is displayed. When the viewing user device 12B receives from the server 13 (i) a message posted by another viewing user and (ii) the image data of the simple avatar object 80, based on these, the viewing user device 12B displays the message display portions 119 and the image of the simple avatar object 80. Additionally, when the viewing user using the viewing user device 12B performs an operation to post a message, the viewing user device 12B sends to the server 13 the image data of the simple avatar object 80 along with the message.

The viewing user device 12B outputs the image of the simple avatar object 80 at the same timing as the message display portion 119 showing the message posted by the viewing user. Also, the viewing user device 12B makes the image of the simple avatar object 80 adjacent to the message display portion 119 showing the content of the posted message and displays the simple avatar object 80 for a certain period of time.

Figure 11:
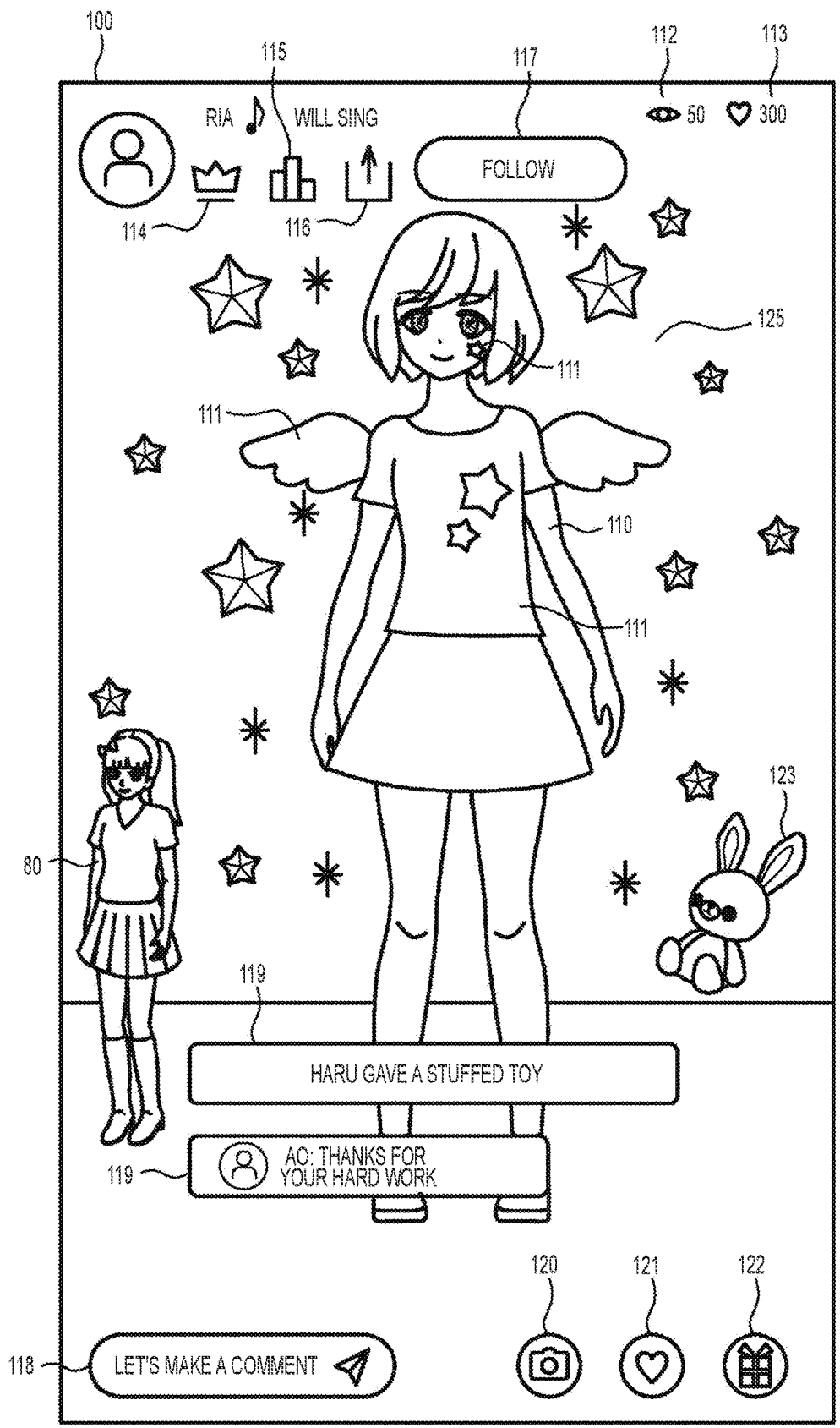
FIG. 11 is a diagram showing a viewing screen of the same embodiment.

In the viewing screen 100 shown in FIG. 11, the simple avatar object 80 of a viewing user that has given a gift object is displayed. When the viewing user using the viewing user device 12B performs an operation that sends a request to display a gift object 123, the viewing user device 12B sends, to the server 13, the image data of the simple avatar object 80 corresponding to the viewing user along with the gift ID. Furthermore, when the viewing user device 12B receives the gift ID and the image data of the simple avatar object 80, based on these, the viewing user device 12B displays the gift object 123 and the simple avatar object 80. The viewing user device 12B has received, from the server 13, the image data of the gift object 123 in advance.

For example, the viewing user device 12B preferably displays the gift object 123 of the received gift ID, the simple avatar object 80, and the message display portion 119 at the same time. Thereby, the viewing user who gave the gift object 123 can be distinguished.

The viewing user device 12B may erase the image of the simple avatar object 80 before the message display portion 119 is erased. Thereby, it is possible to secure display space for other simple avatar objects 80 while making the message display portion 119 viewable. Alternatively, the image of the simple avatar object 80 is erased at the same time as the message display portion 119.

Figure 12:
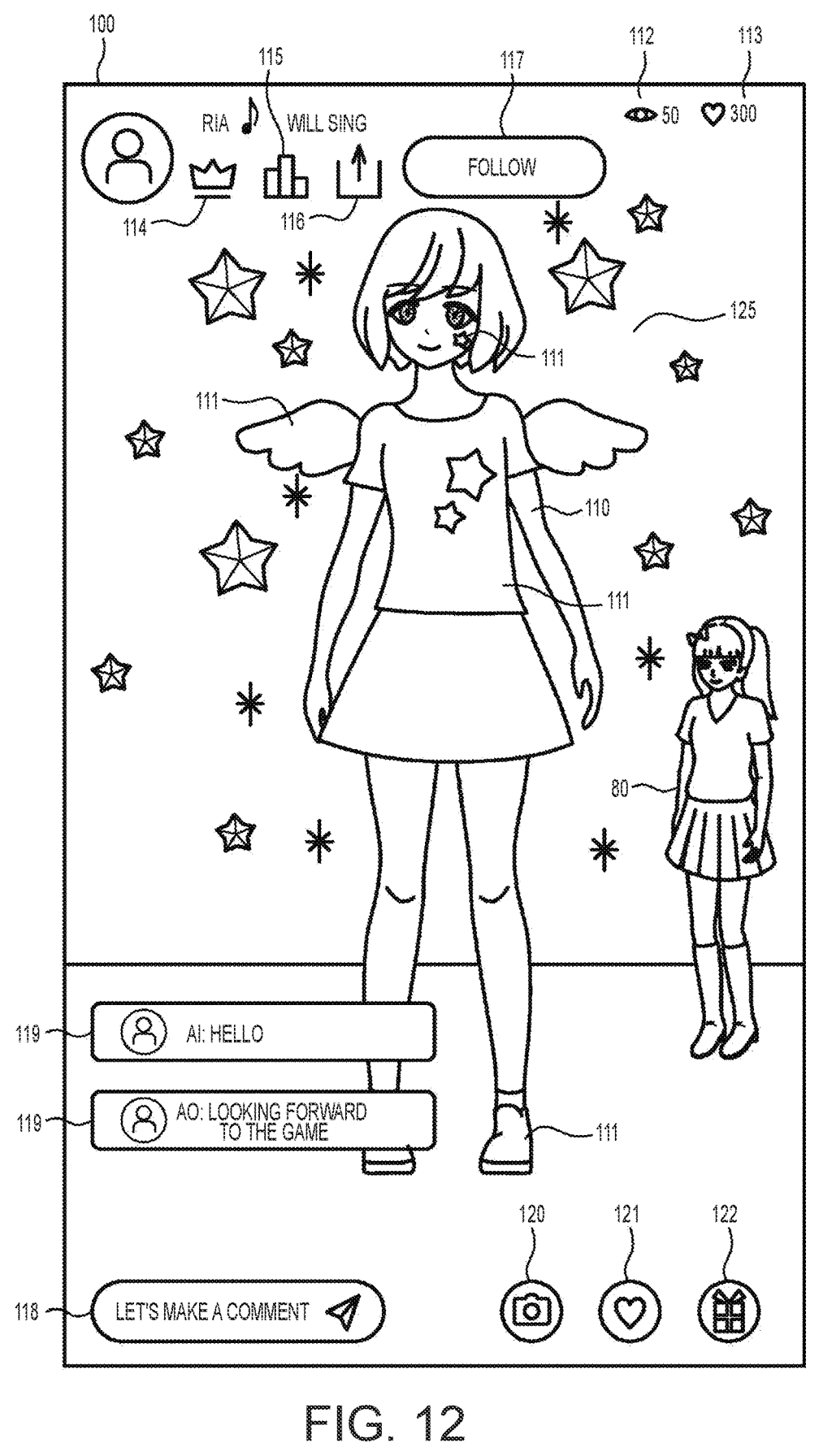

The viewing screen 100 shown in FIG. 12 shows a case in which a profile of the viewing user is displayed by the distributing user. When the distributing user device 12A receives a confirmation operation by the distributing user for confirming the viewing user's profile, the distributing user device 12A outputs, to the display 28, the viewing user's profile information. The viewing user's profile information is stored in the storage 22 by the viewing user device 12B. Additionally, the viewing user device 12B sends profile information of the viewing user to the server 13 at a predetermined timing such as when the viewing user has started viewing the video or when a confirmation operation has been received from the distributing user.

When the distributing user views the viewing user's profile, the server 13 requests the image data of the simple avatar object 80 from the viewing user device 12B used by the viewing user. Furthermore, when the server 13 receives the image data of the simple avatar object 80, the server 13 sends the image data of the simple avatar object 80 to the distributing user device 12A and the viewing user device 12B.

The viewing user device 12B displays the image of the simple avatar object 80 based on the image data received from the server 13. At this time, the simple avatar object 80 may be displayed by movement such as walking from the end of the viewing screen 100 to a predetermined position.

Figure 13:
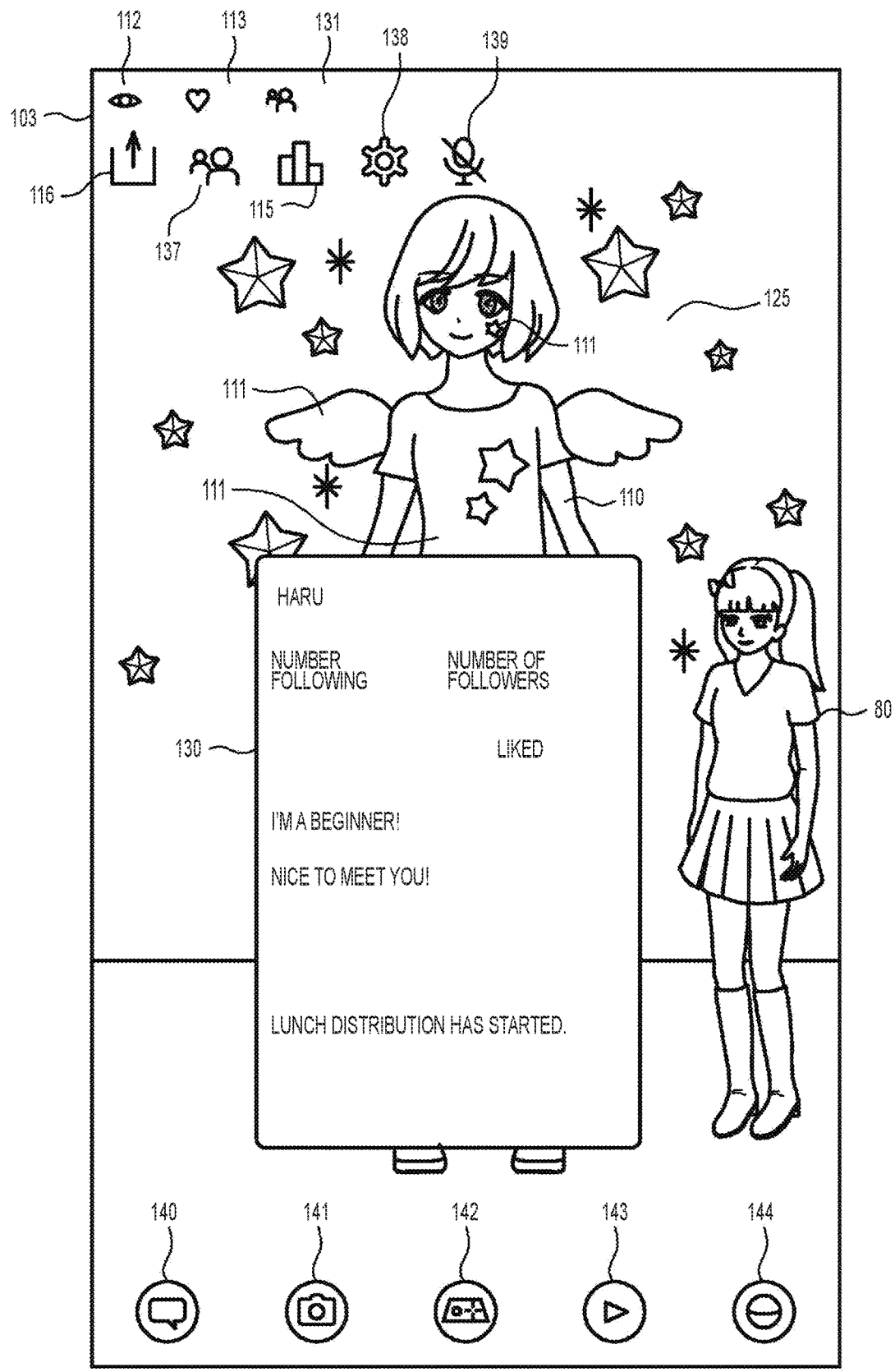
FIG. 13 is a diagram showing a distribution screen of the same embodiment.

FIG. 13 shows an example of a distribution screen 103 that the distributing user device 12A displays on the display 28. Similar to the viewing screen 100, the distribution screen 103 includes an image of the simple avatar object 80. The distributing user device 12A displays profile information 130 of the viewing user corresponding to the simple avatar object 80, in association with the simple avatar object 80. This profile information 130 is not displayed on the viewing user device 12B on which the video is being viewed. This suppresses the viewing user's profile from being disclosed to an unspecified number of other users against the viewing user's own intention. Also, the viewing user can know that the distributing user is checking the viewing user's own profile.

The distribution screen 103 includes the viewer count 112, the total heart count 113, and the number of co-stars 131 who are collaborating. The number of co-stars 131 indicates the number of co-stars participating in collaborative distribution.

The distribution screen 103 also includes a share button 116, a co-star confirmation button 137, a distributing user ranking button 115, a setting button 138, and a voice button 139. The profile information 130 of co-stars can be viewed by selecting co-star confirmation button 137 during collaborative distribution. Also when confirming the profile information 130 of co-stars, the viewing user device 12B displays the viewing screen 100 without the profile information 130 as shown in FIG. 12. By selecting the setting button 138, it is possible to set the distribution. When the voice button 139 is selected, the distributing user device 12A either stops (mutes) the voice output or cancels the voice stop state.

Additionally, the distribution screen 103 includes a comment button 140, a shooting button 141, a game button 142, a video viewing button 143, and a gacha execution button 144. By the comment button 140 being operated, the distributing user device 12A displays an input form that inputs a comment. By the shooting button 141 being operated, the distributing user device 12A captures a video. By the game button 142 being operated, the distributing user device 12A displays a list of games that can be executed during distribution of the video. A live screen of the game is displayed in the video. By the video viewing button 143 being operated, the distributing user device 12A displays a screen that selects a video provided by another video distributing service. By the gacha execution button 144 being operated, the distributing user device 12A displays a list of executable lotteries (gacha).

Effects of the first embodiment will be described.

(1-1) The user device 12 displays the simple avatar object 80, which is a second avatar object, in the video containing the avatar object 110, which is a first avatar object, when the viewing user performs a reference action. This allows the viewing user to have more opportunities to participate in the distribution of the video. Additionally, since the simple avatar object 80 has a smaller processing load for rendering than the avatar object 110 of the distributing user, the processing load of the second output control process that displays the simple avatar object 80 can be reduced. Furthermore, since the message display portion 119 corresponding to the reference action is displayed together with the simple avatar object 80, it can make the action taken by the viewing user stand out.

(1-2) In addition to the avatar object 110 corresponding to the distributing user, the guest avatar object 62, which reflects the movements of a co-starring user, and the guest avatar objects 63 and 64, which do not reflect movements of co-starring users, are displayed in the video. Thus, the co-starring user can participate in the video distribution through the display of his/her avatar object 110 in the video. In addition, since the on-screen size of the simple avatar object is smaller than the avatar object 110 corresponding to the distributing user and the guest avatar objects 62-64, it can be made so as not to interfere with the performance and the like of those avatar objects 110.

(1-3) The guest avatar objects 62-64 are displayed if allowed by the distributing user. In addition, while the simple avatar object 80 can be displayed without the permission of the distributing user, the movements of the viewing user are not reflected in the simple avatar object 80. For this reason, it is possible to suppress the permission granting from becoming complicated during video distribution by the distributing user. Further, by permitting co-starring of only users who are unlikely to perform nuisance actions, nuisance actions by other users can be suppressed.

(1-4) The simple avatar object 80 is displayed in front of the distributing user's avatar object 110 and other objects in a direction parallel to a depth direction of the screen. Therefore, the simple avatar object 80 does not require image processing such as depth comparison with other objects and the like, so the load of the second output control process that displays the simple avatar object 80 can be reduced.

(1-5) The user device 12 displays the simple avatar object 80 in association with the message display section 119 corresponding to the reference action performed by the viewing user. For this reason, the distributing user and the viewing user can associate the action performed by the viewing user with the simple avatar object 80.

(1-6) The user device 12 can display the simple avatar object 80 not only when the viewing user performs the reference action, but also when the distributing user executes the reference action.

(1-7) When the distributing user performs an operation to check the profile information of a viewing user or a guest user, the distributing user device 12A displays the simple avatar object and the profile information 130. Meanwhile, the viewing user device 12B displays the simple avatar object 80 and does not display the profile information 130. For this reason, it is possible to suppress the profile information from being unintentionally disclosed to an unspecified number of other viewing users.

Second Embodiment

Next, a second embodiment of the information processing system is explained. The second embodiment differs from the first embodiment in that the display mode that displays the simple avatar object 80 is changed according to the number of viewing users. Hereinafter, parts similar to those of the first embodiment are denoted by the same reference numerals, and detailed description thereof will be omitted.

The controller 30 of the server 13 stores the number of viewing users in a memory or the like. Upon receiving a video viewing request from a viewing user device 12B, the controller 30 updates the number of viewing users. The number of viewing users may be the cumulative number of viewing users including viewing users who stopped viewing the video, or the number of viewing users who are currently viewing the video.

Based on the action of the viewing user(s), the server 13 switches between a first mode in which an image of the simple avatar object 80 is individually displayed and a second mode in which a plurality of simple avatar objects 80 are displayed simultaneously. A switching condition for switching from the first mode to the second mode is that the number of viewing users in the first mode exceeds the maximum number of users in the first mode.

Figure 14:
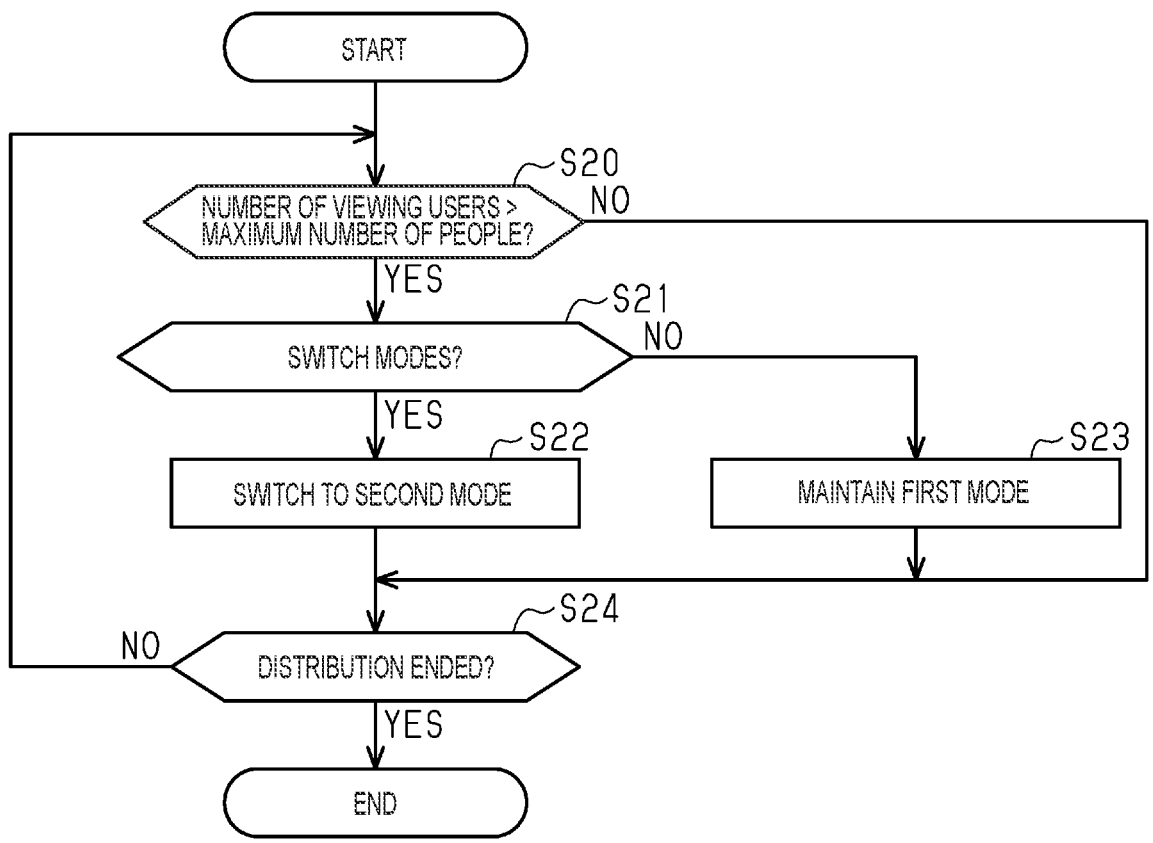
FIG. 14 is a flowchart showing a procedure for switching modes in a second embodiment.

With reference to FIG. 14, a procedure by which the server 13 switches modes is explained. The controller 30 of the server 13 determines whether the number of viewing users exceeds the maximum number of users (step S20). If the controller 30 determines that the number of viewing users is equal to or less than the maximum number of users (step S20: NO), the procedure proceeds to step S24.

When the controller 30 determines that the number of viewing users has exceeded the maximum number of users (step S20: YES), it determines whether or not to switch the mode (step S21). When the number of viewing users has exceeded the maximum number of users, the controller 30 sends a notification that the mode can be switched, and causes the distributing user device 12A to output the notification. Furthermore, when the server 13 receives a mode switching request from the distributing user device 12A that has received an instruction operation of the distributing user, it determines to switch the mode to the second mode. When the server 13 receives a request to maintain the mode from the distributing user device 12A that has received the instruction operation of the distributing user, it determines to maintain the first mode.

When the controller 30 determines not to switch the mode to the second mode (step S21: NO), the first mode is maintained (step S23), and the procedure proceeds to step S24.

When the controller 30 determines to switch the mode to the second mode (step S21: YES), it switches the display mode of the video to the second mode (step S22). Specifically, the controller 30 sends a mode switching request to the distributing user device 12A and the viewing user device 12B. The viewing user device 12B sends the image data of the simple avatar objects 80 corresponding to each of the viewing users to the server 13 at the time of receiving the mode switching request or at a predetermined timing before that. At this time, the viewing user device 12B may send the part IDs of the simple avatar objects 80 instead of the image data of the simple avatar objects 80.

In the second mode, the server 13 sends the video configuration data sent from the distributing user device 12A to the viewing user device 12B. Additionally, the server 13 also sends the image data of the simple avatar object 80 received from the viewing user device 12B to the distributing user device 12A and the viewing user device 12B. Also, each user device 12 displays the simple avatar object 80 based on the image data received from the server 13.

At this time, the user devices 12 may display the simple avatar objects 80 of all viewing users. In addition, among all viewing users, a predetermined number of simple avatar objects 80 may be displayed. For example, if the number of viewing users is 50 or more, the simple avatar objects 80 of the viewing users corresponding to 20 viewing users may be displayed. Then, the simple avatar objects 80 of all the viewing users may be divided into multiple display times and displayed. In this case, when the display of the simple avatar objects 80 is switched, the newly displayed plurality of simple avatar objects 80 may be displayed so as to march from outside the screen to enter the screen in the order in which viewing was started. In other words, the newly displayed plurality of simple avatar objects 80 may be moved in one direction. Similarly, when the display of the simple avatar objects 80 is replaced, the exiting plurality of simple avatar objects 80 may be displayed as if they are marching off the screen.

Furthermore, the user device 12 may reduce the load of the rendering process of the simple avatar objects 80 in the second mode to less than the load of the rendering process of the simple avatar objects 80 in the first mode. Alternatively, when the server 13 sends the image data of the simple avatar objects 80 to each of the user devices 12, the server 13 may send the image data of the simple avatar objects 80 with a smaller load of rendering processing. For example, the simple avatar objects 80 in the second mode may be displayed as image data of a plurality of simple avatar objects 80, not as individual objects.

The server 13 determines whether or not the distribution of the video has ended (step S24). If the server 13 determines that the video distribution has not ended (step S24: NO), the procedure returns to step S20. Further, when the server 13 determines that the video distribution has ended (step S24: YES), it ends this process.

If the number of viewing users, which is a condition for switching from the first mode to the second mode, is the number of viewing users currently viewing, the number of viewing users may become equal to or less than the maximum number of users after transitioning to the second mode. After transitioning to the second mode, if the number of viewing users becomes equal to or less than the maximum number of users, the second mode may be maintained. Alternatively, if the number of viewing users becomes equal to or less than the maximum number of users after transitioning to the second mode, the mode may be returned to the first mode.

Figure 15:
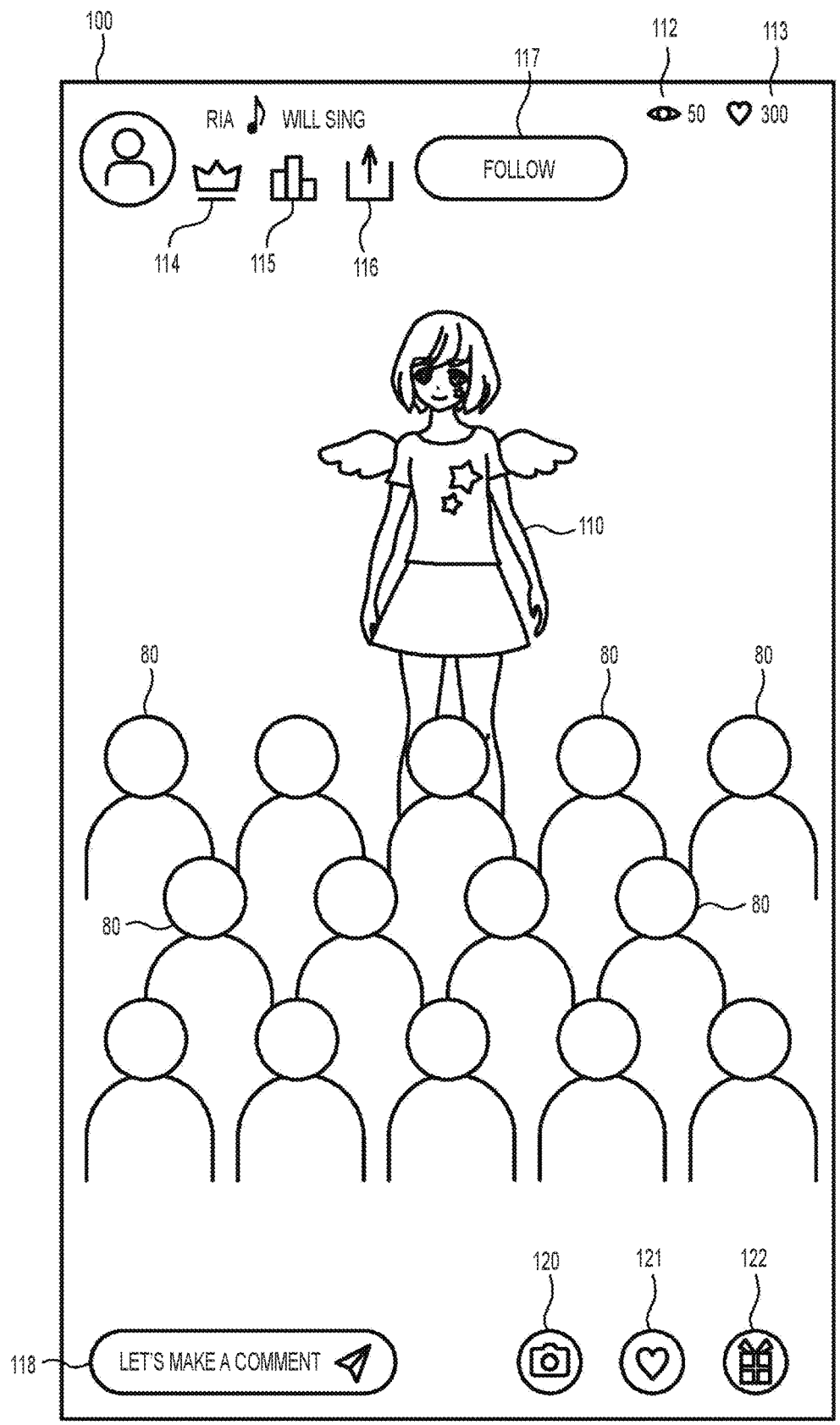
FIG. 15 is a diagram showing a viewing screen of the second embodiment.

FIG. 15 shows the viewing screen 100 in the second mode. The viewing screen 100 includes an avatar object 110 of the distributing user and simple avatar objects 80 of a plurality of viewing users. The simple avatar objects 80 may be arranged in front of the avatar object 110 positioned on a stage, as illustrated in FIG. 15. Alternatively, the simple avatar objects 80 may be arranged so as to surround the avatar object 110.

When a viewing user performs an operation for sending a gift display request on a viewing user device 12B, the viewing user device 12B sends, to the server 13, the gift ID, the user ID, and the image data of the simple avatar. The server 13 sends, to the user device 12, the gift ID, the user ID, and image data of the simple avatar object 80. At this time, the server 13 displays the simple avatar object 80 of this viewing user on the user device 12 in a way that makes it stand out from the other simple avatar objects 80. For example, the simple avatar object 80 is displayed adjacent to the avatar object 110 of the distributing user. If the avatar object 110 is located on the stage, the simple avatar object 80 is also located on the stage.

According to the second embodiment, in addition to the effects described in the first embodiment (1-1)-(1-7), the following effect may be obtained.

(2-1) When the number of viewing users exceeds a maximum number of users, the simple avatar objects 80 of a plurality of viewing users can be displayed. This makes it possible to create the effect that the viewing users are participating in the live venue of the distributing user.

Third Embodiment

Next, a third embodiment of the information processing system will be explained. The third embodiment differs from the first embodiment in that, when the gift object 123 is displayed, the display mode of the gift object 123 is changed based on whether or not the viewing user who made that display request is viewing the video. Hereinafter, parts similar to those of the first embodiment are denoted by the same reference numerals, and detailed description thereof will be omitted.

Figure 16:
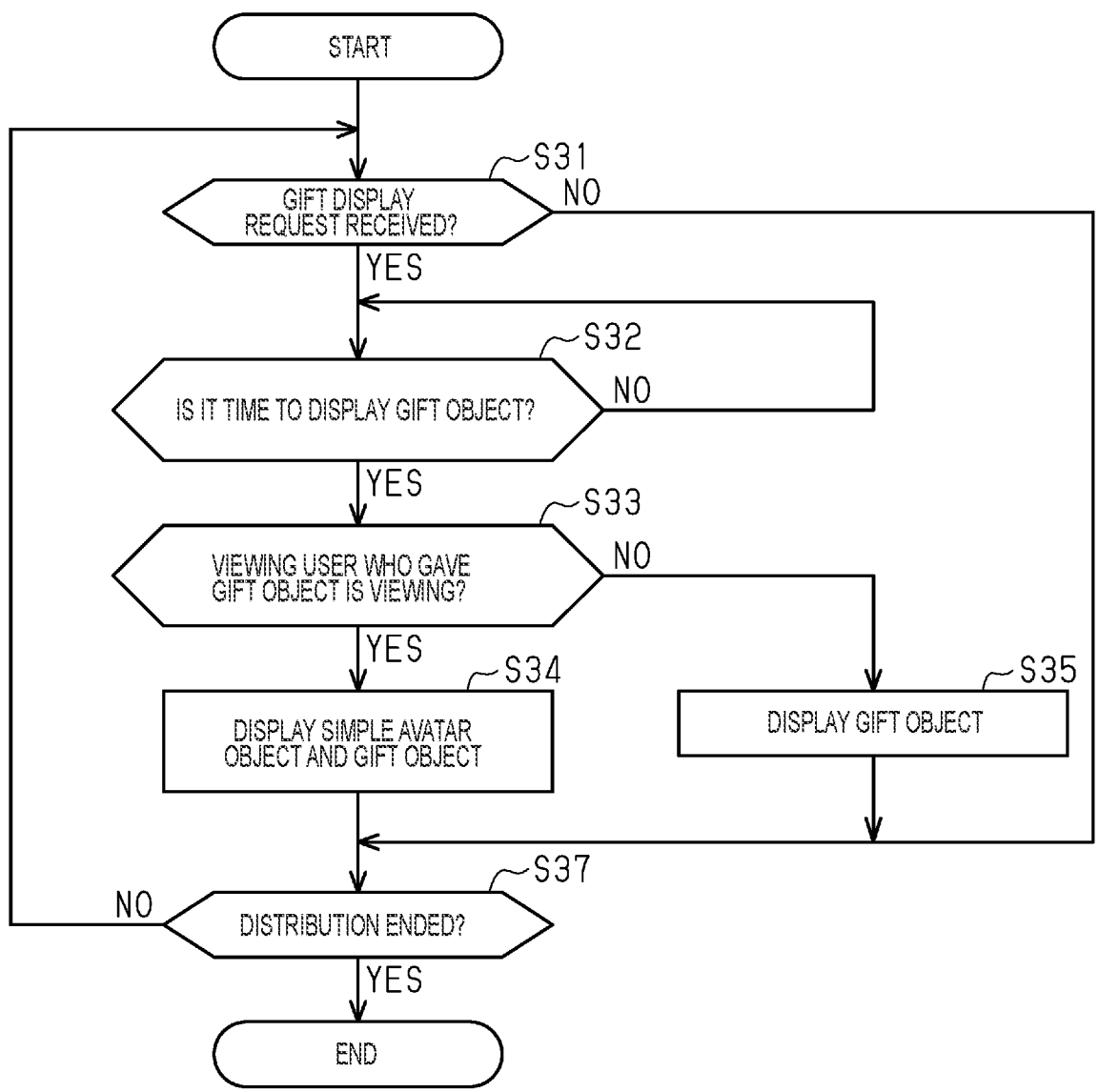
FIG. 16 is a flowchart showing a procedure that displays a gift object of another embodiment.

With reference to FIG. 16, a procedure will be explained in which the server 13 sends to the user device 12 a request to display the gift object 123. Hereinafter, a request to display the gift object 123 is referred to as a gift display request.

The server 13 determines whether or not a gift display request has been received (step S31). At this time, the server 13 has received the image data of the simple avatar object 80 at the same time as or before the gift display request. If the gift display request has not been received (step S31: NO), the procedure proceeds to step S37. If the server 13 determines that the gift display request has been received (step S31: YES), it is determined whether or not it is time to display the gift object 123 (step S32).

Here, the server 13 determines the timing of displaying the gift object 123 according to the attributes of the gift object 123. When the display timing is not particularly limited, such as in the case of a stuffed toy, the server 13 causes the viewing user device 12B to display the gift object 123 upon receiving the gift display request. If the gift object is an attached object, the distributing user device 12A is notified that the gift object 123, which is an attached object, has been given. If the distributing user performs an operation, in response to the notification that allows the display of the attached object, the viewing user device 12B is caused to display the gift object 123. However, the distributing user allowing the display of the attached object is one example. The server 13 may cause the viewing user device 12B to display the gift object 123 upon receiving the gift display request for the attached object.

Also, the display position of the gift object 123 may be determined. For example, a gift object 123 such as "wallpaper," "hanging scroll," or "tower cake" is displayed at a predetermined display position for a certain period of time. However, if a gift object 123 that is already displayed at a display position is not erased, a new gift object 123 cannot be displayed. In such a case, it is determined that it is time to display the gift object 123 when the display position associated with the gift object 123 becomes available.

If the server 13 determines that it is not time to display the gift object 123 (step S32: NO), the display timing of the gift object 123 is awaited. If the server 13 determines that it is time to display the gift object 123 (step S32: YES), it is determined whether or not the viewing user that has given the gift object 123 is viewing the video (step S33).

If the server 13 determines that the viewing user that has given the gift object 123 is viewing the video (step S33: YES), it displays the simple avatar object 80 and the gift object 123 on the user device 12 (step S34). Specifically, the server sends to the user device 12 the gift ID and the image data of the simple avatar object 80. When the user device 12 receives the gift ID and the image data of the simple avatar object 80, it draws the gift object 123 corresponding to the gift ID and the image of the simple avatar object 80. At this time, it is preferable to output the simple avatar object 80 and the gift object 123 at the same timing. Alternatively, it is preferable that the display period of the simple avatar object 80 and the display period of the gift object 123 overlap.

Meanwhile, if the server 13 determines that the viewing user that has given the gift object 123 is not viewing the video (step S33: NO), the server 13 displays the gift object 123 without displaying the simple avatar object 80 (step S35). Specifically, the server 13 sends the gift ID to the user device 12. If the user device 12 receives the gift ID, the user device 12 draws the gift object 123 corresponding to the gift ID.

That is, the timing at which the viewing user device 12B has sent the gift display request is slightly different from the timing at which the gift object 123 is displayed. Additionally, depending on the attributes of the gift object 123, it may take time until the gift object 123 is displayed. Furthermore, there is a possibility that the viewing user who has given the gift object 123 will end viewing during the period from when the viewing user device 12B sends the gift display request to when the gift object 123 is displayed.

Also in this embodiment, as in the above embodiment, the simple avatar object 80 corresponding to the viewing user who has given the gift object 123 is displayed. However, if the viewing user ends viewing the video before the gift object 123 is displayed, if the simple avatar object 80 is displayed even though the viewer has finished viewing the video, the viewing user or the distributing user may feel uncomfortable. For this reason, if the viewing user has finished viewing the video before displaying the gift object 123, the simple avatar object 80 is not displayed.

In step S37, if the server 13 does not end the distribution (step S37: NO), the procedure returns to step S31, and repeats the determination of whether or not the gift display request has been received. If the server 13 ends the distribution (step S37: YES), the processing ends.

According to the third embodiment, in addition to the effects described in (1-1) and (1-7) of the first embodiment, the following effect can be obtained.

(3-1) If a viewing user that has sent a gift display request continues to view, the user device 12 displays the gift object 123 and the simple avatar object 80. Furthermore, if the viewing user that has sent the gift display request does not continue to view, the user device 12 displays the gift object 123 without displaying the simple avatar object 80. For this reason, even though the viewing user has left, it is possible to suppress the distributing user and other viewing users from feeling uncomfortable due to the simple avatar object 80 of the viewing user being displayed even though the viewer has left.

Each of the above embodiments can be implemented with the following modifications. The above embodiments and the following modified examples can be implemented in combination with each other within a technically consistent range.

<User>
In each of the above embodiments, the distributing user means a user who sends at least one of information related to video and information related to voice. For example, a distributing user is a user who executes independent video distribution or collaborative distribution in which multiple people can participate. Alternatively, a distributing user may host or hold a video chat or voice chat that can be participated in and/or viewed by a plurality of people, or an event (party or the like) in a virtual space that can be participated in and/or viewed by a plurality of people can participate and/or view. That is, the distributing user can also be called a host user, sponsor user, or hosting user.

Meanwhile, a viewing user means a user who receives at least one of information related to video and information related to voice. However, the viewing user can be a user who not only receives the above information, but also can react to it. For example, a viewing user is a user who views video streaming or collaborative streaming. Alternatively, a viewing user can be a user who participates in and/or views a video chat, voice chat, or an event. Therefore, a viewing user can also be a guest user, a participating user, a listener, a watching user, a cheering user, and so on.

<Collaborative Distribution>
In each of the above embodiments, simple avatar objects 80 are displayed one by one, but a plurality of simple avatar objects 80 may be displayed. Even in this case, it is preferable to display the correspondence between the message display portion 119 of the reference action and the simple avatar object 80 so as to be identifiable.

In each of the above embodiments, when the distributing user has allowed participation, it is made possible for a co-star user to participate in collaborative distribution. Alternatively or in addition, a co-user may be allowed to participate in collaborative distribution without permission from the distributing user. In this case, only an avatar object of a user whose viewing user status information meets a predetermined condition may be displayed as an avatar object 110 to which tracking data is applied. Furthermore, the avatar object of a user whose video activity does not meet the predetermined condition is displayed as a simple avatar object 80. The status information is information indicating the user's activity with respect to the video or information about the user that is directly or indirectly related to the video.

In collaborative distribution, the guest avatar objects 63, 64 displayed at the back left and back right positions 72, 73 may be objects that require less processing load for rendering than the host avatar object 61 and the guest avatar object 62. For example, tracking data for the second and third guest users is not applied to the guest avatar objects 63 and 64.

In addition, the data for rendering the guest avatar objects 63 and 64 requires less processing load for rendering than the data for rendering the host avatar object 61 and the like. For example, the data for rendering the guest avatar objects 63 and 64 is data for rendering a two-dimensional object(s). In other words, the guest avatar objects 63 and 64 are drawn as two-dimensional objects.

The image data for rendering the guest avatar objects 63 and 64 is generated by the viewing user device 12B that draws the video. Alternatively, it may be sent from the user devices 12 used by the second and third guest users.

The rendering data for rendering the guest avatar objects 63, 64 may be data with a reduced number of polygons. By reducing the number of polygons, the load of image processing can be reduced. Alternatively, the rendering data for rendering the guest avatar objects 63, 64 may be data that integrates multiple parts such as body parts and attached parts that constitute the avatar objects into one. By reducing the number of parts, the load of image processing can be reduced compared to rendering the parts individually.

Alternatively, the guest avatar objects 63, 64 may omit components that perform physical behavior associated with the host avatar object 61. For example, even if the guest avatar objects 63, 64 and another object overlap, no collision determination may be made.

Furthermore, in addition to the distributing user device 12A, the user device 12 used by each guest user may send to the server 13 voice data that is based on speech of the guest user. That is, the user device 12 displaying the video outputs voice of the host user and voice of each guest user in synchronization with the video.

Alternatively, of the user devices 12 used by the guest users, only the user device 12 used by the first guest user may send voice data to the server 13. The voices of the host user and the first guest user may be output, and the voices of the second guest user and the third guest user may not be output.

<Simple Avatar Object>
In the above embodiments, the user device 12 draws the simple avatar object 80 as a two-dimensional object without applying tracking data of the viewing user. Alternatively, the user device 12 may draw the simple avatar object 80 as a two-dimensional object to which the tracking data of the viewing user is applied. Also, the simple avatar object 80 may be drawn as a three-dimensional object without applying the tracking data of the viewing user. Also, the simple avatar object 80 may be drawn as a three-dimensional object with a reduced number of polygons. In the above embodiments, although the avatar object 110 of the viewing user is made two-dimensional, the user device 12 may store in advance the image data of the simple avatar object 80 corresponding to the avatar object 110 of a three-dimensional object. This image data may be image data in which the avatar object 110 is transformed (deformed). For example, it may be data related to a low-body-proportion simple avatar object 80 that is an enlarged head of the avatar object 110.

In the first embodiment, actions of a viewing user such as following a distributing user, sharing a distributed video, capturing the distributed video (screenshot), and finishing viewing of a video, were not considered reference actions. However, the simple avatar object 80 may be displayed when any of these actions are executed.

The simple avatar object 80 may change according to the actions of the viewing user in the video. When the simple avatar object 80 is displayed, the user who is viewing the video may not know what trigger causes the simple avatar object 80 to be displayed. In particular, there is a limit to the information that can be displayed on a smartphone or the like with a small screen size. For this reason, a simple avatar object 80 may be prepared for each action of the viewing user that triggers the display of the simple avatar object 80. Also, the simple avatar object 80 may be a still image, or may have predetermined motion data applied thereto. For example, when the viewing user selects a good review button 121, the simple avatar object 80 with a "good sign" may be displayed. Also, when the viewing user selects the gift button 122, a simple avatar object 80 holding a gift box may be displayed. Also, when the viewing user posts a message, a simple avatar object 80 holding an envelope may be displayed. Also, while the distributing user device 12A is displaying the profile information 130, the simple avatar object 80 may be holding a plate displaying an account name of the viewing user or raising its hand. The user device 12 creates image data of a plurality of simple avatar objects 80 corresponding to the reference actions and stores the image data in the storage 22. According to this embodiment, when the simple avatar object 80 is displayed, the distributing user and the viewing user can understand the trigger that caused the simple avatar object 80 to be displayed.

<Reference Actions>

In each of the above embodiments, the system for displaying the simple avatar object 80 (second avatar object) is configured such that the distributing user distributes the video using the distributing user device 12A and the viewing user views the video using the viewing user device 12B. Alternatively, the system that displays the simple avatar object 80 may be configured as a system that outputs to the user device 12 an image of a metaverse (virtual space) in which an avatar object corresponding to the user moves. In this metaverse, a second user may visit a small space where a first user talks or performs. The small space is a room, a live venue, or the like. In this embodiment, when the other user visits the small space, the simple avatar object 80 may be displayed. In this case, as the number of user avatar objects gathering in the small space increases, the processing load on the user device 12 increases. Therefore, the processing load can be reduced by displaying the simple avatar object 80.

In the first embodiment, an action in which the distributing user posts a comment on a video may be used as a reference action. When the comment button 140 is used to specify the viewing user who is the destination of the comment, the simple avatar object 80 corresponding to the viewing user may be displayed on the distribution screen and the viewing screen. Furthermore, for example, when a viewing ranking button (not shown) displayed on the distribution screen is selected by the distributing user, the simple avatar objects 80 of the viewing users included in the viewing ranking may be displayed in order.

<Display Mode of Simple Avatar Object>

In the second embodiment, when the number of viewing users exceeds the maximum number of users in the first mode, the user device 12 draws the simple avatar object 80 of the viewing user in the second mode. Alternatively, the rendering mode may be selected according to the type of viewing user device 12B. For example, when the viewing user device 12B is a smartphone, the simple avatar object 80 is drawn in the first mode. Furthermore, when the viewing user device 12B is a personal computer or a head-mounted display, the simple avatar object 80 is drawn in the second mode. At this time, the viewing user device 12B acquires its own specification information, and the viewing user device 12B may determine whether or not the simple avatar object 80 can be drawn in the second mode using the specification information. Then, if the viewing user device 12B determines that the simple avatar object 80 can be drawn in the second mode, the viewing user device 12B may transition to the second mode.

In the second embodiment, the rendering mode may be switched according to an action of the user. Specifically, the distributing user device 12A determines whether the distributing user is singing or conversing. If the distributing user device 12A determines that the distributing user is singing, a display request in the second mode is sent to the viewing user device 12B via the server 13. When the display request in the second mode is received, the viewing user device 12B draws the simple avatar object 80 in the second mode, using the image data of the simple avatar object 80 of the viewing user that was received in advance. If the distributing user device 12A determines that the distributing user is conversing, a display request in the first mode is sent to the viewing user device 12B via the server 13. When the display request in the first mode is received, the viewing user device 12B draws the simple avatar object 80 in the first mode, using the image data of the simple avatar object 80 of the viewing user that was received in advance.

In each of the above embodiments, when the distributing user allows participation, it is made possible for a co-star user to participate in collaborative distribution. Alternatively or in addition, a co-user may be allowed to participate in collaborative distribution without permission from the distributing user. In this case, only the avatar object of the user whose activity in the video meets a predetermined condition may be displayed as the avatar object 110 to which the tracking data is applied. In addition, the avatar object of the user whose activity in the video does not meet a predetermined condition may be displayed as the simple avatar object 80.

<Predetermined Condition Related to Viewing User>

In each of the above embodiments, the simple avatar object 80 is drawn based on an action of the viewing user. In addition to this, the simple avatar object 80 may be drawn when viewing user status information meets a predetermined condition related to the viewing user. The status information is information indicating the user's activity with respect to the video or information about the user that is directly or indirectly related to the video. Information indirectly related to the video is, for example, information that the server 13 can obtain from an external server. The server 13 obtains information indirectly related to the video using the external server's API (Application Programming Interface).

For example, the status information is information indicating a friend relationship between the distributing user and the viewing user. When the viewing user who has followed the distributing user executes a reference action, the user device 12 may draw a simple avatar object 80 of the viewing user. That is, identification information of the distributing user may be included in a follow list or friend list stored in the viewing user device 12B or the like. Also, the status information may be information about a group to which the viewing user belongs. A predetermined condition may be that the user belongs to a fan club that supports the distributing user or a group to which the distributing user belongs. Also, the status information may also be information indicating the viewing user's activity with respect to the video. A predetermined condition is that a cheerleading ranking of the distributing user is at or above a predetermined ranking. Alternatively, the condition for the viewing user displaying the simple avatar object 80 is that it is the first time the user has viewed the video. Alternatively, conditions for the viewing user for displaying the simple avatar object 80 are that (i) the cumulative viewing time of the viewing user is greater than or equal to a predetermined time, (ii) the number of times viewed is greater than or equal to a predetermined number of times, and/or (iii) the cumulative viewing time of a video distributed by a specific distributor is greater than or equal to a predetermined time. The cumulative viewing time and the number of times viewed may be the cumulative viewing time and the number of times viewed of a video distributed by a specific distributor. Also, the cumulative viewing time and the number of times viewed may be the cumulative viewing time and the number of times viewed obtained by totaling the cumulative viewing time and the number of times viewed for each video distributed by a plurality of distributors. Alternatively, the condition for the viewing user to display the simple avatar object 80 is that the number of times a gift display request has been sent is greater than or equal to a predetermined number of times. Alternatively, the condition for the viewing user to display the simple avatar object 80 is that he/she has posted a message a predetermined number of times or more. Alternatively, the condition for the viewing user to display the simple avatar object 80 is that the user has given a gift object of a predetermined amount or more. Alternatively, the condition for the viewing user to display the simple avatar object 80 is that the amount charged has reached a reference value. Additionally, after displaying the simple avatar object 80 once, the simple avatar object 80 may not be displayed. In this case, by limiting the viewing users who can display the simple avatar object 80, all simple avatar objects 80 that meet the display condition can be displayed, even on a smartphone with limited display area.

In the above embodiments, when a plurality of viewing users gives a gift to the distributing user, simple avatar objects 80 corresponding to these viewing users may be drawn. For example, the viewing user device 12B displays a screen of a group chat in which a plurality of viewing users chat. The group chat can be one of text chat, voice chat where the conversation is possible by voice, and video chat, or a combination thereof. One viewing user device 12B that makes a gift display request sends a gift ID and a group ID to the server 13. Instead of the group ID, a user ID of a user belonging to the group may be sent. Upon receiving the gift display request, the server 13 requests image data of the simple avatar objects 80 from the viewing user devices 12B of the viewing users associated with the group ID. The viewing user devices 12B of the viewing users belonging to the group send the image data of the simple avatar objects 80 to the server 13. The server 13 sends the received image data of the simple avatar objects 80 to each user device 12. Each user device 12 simultaneously draws the simple avatar objects 80 of the viewing users belonging to the group together with the gift object corresponding to the gift ID. Alternatively, each user device 12 draws the simple avatar object 80 of a representative among the viewing users belonging to the group together with the gift object corresponding to the gift ID. The representative may be the viewing user who made the gift display request or a predetermined viewing user in the group. If a representative is predetermined, the user ID of that user is recorded in the user devices 12 or the server 13.

When the distribution end button is selected and operated on the distributing user device 12A, image data may be generated in which the avatar object 110 of the distributing user and the simple avatar object 80 of the viewing user(s) are assembled. The user device(s) 12 displays the simple avatar objects 80 of all or part of the viewing users in the video in addition to the avatar object of the distributing user. Also, the user device(s) 12 captures the screen and displays it on the display 28 as a group photo. Furthermore, the user device(s) 12 stores the generated image data in the storage 22.

In each of the above embodiments, the user device(s) 12 generated the image data of the simple avatar object 80 and sent it to the server 13. Alternatively or additionally, the server 13 may generate the image data. Alternatively, the user device 12 may generate image data of the simple avatar object(s) 80 when generating video data. In this case, the part IDs of the body parts and the part IDs of the attached parts of the avatar object 110 of each viewing user are obtained in advance. The device that generates the image data of the simple avatar object 80 can be changed according to the video distribution method or the like.

(Information Processing System)

The sensor portion 24 is made to acquire detection data that detects changes in the user's facial expression, head movement, and the user's relative position with respect to the sensor portion 24, but even at least one of these is acceptable. In addition, the sensor portion 24 may acquire other detection data such as detection data that detects movement other than head movement, in addition to or instead of at least one out of the changes in the user's facial expression, the head movement, and the user's relative position.

The virtual space displayed in the video may be an augmented reality (AR) space. For example, an animation of an avatar object and a gift object or the like that is based on the data sent from the distributing user device 12A may be superimposed and displayed on a real-world image taken by the camera of the viewing user device 12B. Alternatively, the distributing user device 12A may generate a video by superimposing an animation of an avatar object and a gift object or the like on a real-world image taken by its own camera, encode the video, and send the video to the server 13.

In each of the above embodiments, the user device 12 is an information processing device such as a smartphone, a mobile phone, a tablet terminal, a personal computer, a game console, or a wearable computer such as a head-mounted display. Instead of this, the video distribution system may be a system provided in a studio for video distribution. The video distribution system includes an information processing device, a server, the sensor portion 24 mounted on the body of a distributing user, a tracking system for detecting the position of the sensor portion 24, the operation portion 27, the speaker 25, and the display 28. The tracking system may include a multi-axis laser emitter that emits pulsed laser light for synchronization. The sensor portion 24 includes a sensor that detects the laser beam, and detects its own position and orientation while synchronizing with the synchronization pulse. As the sensor portion 24, for example, Vive Tracker (registered trademark) and Vive Base Station (registered trademark) provided by HTC Corporation (registered trademark) can be used.

The controller 20 of the user device 12 executes the first output control process, the second output control process, and the third output control process by executing the application program. At least one of these may be executed by the server 13 or another device constituting the information processing system 11. Furthermore, the controller 30 of the server 13 executes the first process, the second process, the third process, and the fourth process. At least one of these may be executed by the user device 12 or another device constituting the information processing system 11.

EXPLANATION OF SYMBOLS

11 Information processing system
12 User device
13 Server

The invention claimed is:

1. A non-transitory computer-readable medium storing thereon a program that causes one or more processors to execute:
a first output control process that outputs to a display a video including a first avatar object to which tracking data showing movement of a first user is applied; and
a second output control process which, when an action of a second user with respect to the video corresponds to a predetermined reference action, displays in the video, together with the first avatar object, for a display period shorter than a display period of the first avatar object, (i) a second avatar object corresponding to the second user and to which tracking data showing movement of the second user is not applied, a rendering processing load of the second avatar object being smaller than that of the first avatar object, and (ii) information corresponding to the reference action, wherein
the rendering processing load of the second avatar object is made smaller than that of the first avatar object by using at least one of the following techniques: rendering the second avatar object as a two-dimensional object, reducing the number of polygons for the second avatar object, and rendering the second avatar object with a display size that is smaller than a display size of the first avatar object, and
the rendering processing load of the second avatar object is made smaller than that of the first avatar object automatically and regardless of any selections made by the second user in generating the second avatar object.

2. The non-transitory computer-readable medium according to claim 1, wherein
in the second output control process, voice data input by the first user is output, and voice data input by the second user is not output.

3. The non-transitory computer-readable medium according to claim 1, wherein the program causes the one or more processors to further execute:
a third output control process that, when a co-starring user participates in the video, outputs to the display the video including (i) the first avatar object and (ii) a third avatar object to which tracking data showing movement of the co-starring user is applied, wherein
in the second output control process, the second avatar object is displayed smaller in size than the first and third avatar objects.

4. The non-transitory computer-readable medium according to claim 1, wherein the program causes the one or more processors to further execute:
a third output control process that, in response to determining that the first user grants permission on a first user device for a co-starring user to participate, outputs to the display the video including (i) the first avatar object and (ii) a third avatar object to which tracking data showing movement of the co-starring user is applied, wherein
in the second output control process, in response to determining that the second user satisfies a condition that the reference action has been executed, the second avatar object is displayed in the video.

5. The non-transitory computer-readable medium according to claim 1, wherein
in the second output control process, the second avatar object is displayed in association with a message that includes content corresponding to the reference action.

6. The non-transitory computer-readable medium according to claim 1, wherein
in the second output control process, when an action of the first user with respect to the video corresponds to the reference action, the second avatar object of the second user that is a subject of the reference action is displayed in the video.

7. The non-transitory computer-readable medium according to claim 6, wherein
the reference action of the first user is that a first user device used by the first user has sent a request to display profile information of the second user, and
the profile information of the second user and the second avatar object are displayed on the first user device, and the second avatar object is displayed on a second user device used by the second user.

8. The non-transitory computer-readable medium according to claim 1, wherein
in the second output control process, the second avatar object is displayed only when the second user, whose status information meets a predetermined condition, has performed the reference action.

9. The non-transitory computer-readable medium according to claim 8, wherein
the status information of the second user indicates a friend relationship with the first user, and
the predetermined condition is that a friend list of the second user includes identification information of the first user.

10. The non-transitory computer-readable medium according to claim 8, wherein
the status information of the second user relates to a group to which the second user belongs, and the predetermined condition is that the group to which the second user belongs includes the first user.

11. The non-transitory computer-readable medium according to claim 8, wherein
the status information of the second user indicates activity with respect to the video, and the predetermined condition is that a number of times the video distributed by the first user has been viewed is equal to or greater than a predetermined number, or that a cumulative viewing time acquired by accumulating a viewing time of the video distributed by the first user is equal to or greater than a predetermined time.

12. The non-transitory computer-readable medium according to claim 8, wherein
the status information of the second user indicates activity with respect to the video, and the predetermined condition is that a number of times a message has been posted to the video distributed by the first user, or a number of times a request to display a gift object has been sent, is equal to or greater than a predetermined number of times.

13. The non-transitory computer-readable medium according to claim 8, wherein
the status information of the second user indicates activity with respect to the video, and the predetermined condition is that a monetary charge for the video distributed by the first user has reached a reference value.

14. The non-transitory computer-readable medium according to claim 1, wherein the program causes the one or more processors to further execute:
a process that determines whether a number of the second users viewing the video has exceeded a predetermined number, wherein
in the second output control process, when the number of the second users is equal to or less than the predetermined number, a plurality of the second avatar objects is each individually displayed one by one, and when the number of the second users exceeds the predetermined number, the plurality of second avatar objects is simultaneously displayed within the same period.

15. The non-transitory computer-readable medium according to claim 1, wherein
the reference action is that a second user device used by the second user has started viewing the video.

16. The non-transitory computer-readable medium according to claim 1, wherein
the reference action is that a second user device used by the second user has sent information relating to a review of the video.

17. The non-transitory computer-readable medium according to claim 1, wherein
the reference action is that a second user device used by the second user has posted a message with respect to the video.

18. The non-transitory computer-readable medium according to claim 1, wherein
the reference action is that a second user device used by the second user has sent a request to display a gift object with respect to the video.

19. An information processing method by one or more processors, the method comprising:
a first output control process that outputs to a display a video including a first avatar object to which tracking data showing movement of a first user is applied; and
a second output control process which, when an action of a second user with respect to the video corresponds to a predetermined reference action, displays in the video, together with the first avatar object, for a display period shorter than a display period of the first avatar object, (i) a second avatar object corresponding to the second user and to which tracking data showing movement of the second user is not applied, a rendering processing load of the second avatar object being smaller than that of the first avatar object, and (ii) information corresponding to the reference action, wherein
the rendering processing load of the second avatar object is made smaller than that of the first avatar object by using at least one of the following techniques: rendering the second avatar object as a two-dimensional object, reducing the number of polygons for the second avatar object, and rendering the second avatar object with a display size that is smaller than a display size of the first avatar object, and
the rendering processing load of the second avatar object is made smaller than that of the first avatar object automatically and regardless of any selections made by the second user in generating the second avatar object.

20. An information processing device comprising:
one or more processors programmed to:
cause a video including a first avatar object to which tracking data showing movement of a first user is applied to be output to a display of a second user device used by a second user based on a video viewing request from the second user device;
acquire, from the second user device, information corresponding to a predetermined reference action that is an action of the second user with respect to the video;
acquire, from the second user device, data for rendering a second avatar object corresponding to the second user and to which tracking data showing movement of the second user is not applied, the data for rendering the second avatar object having a rendering processing load smaller than that of the first avatar object; and
when the action of the second user with respect to the video corresponds to the reference action, cause to be displayed in the video, together with the first avatar object, for a display period shorter than the display period of the first avatar object, (i) the second avatar object and (ii) information corresponding to the reference action, wherein
the rendering processing load of the data for rendering the second avatar object is made smaller than that of the first avatar object by using at least one of the following techniques: rendering the second avatar object as a two-dimensional object, reducing the number of polygons for the second avatar object, and rendering the second avatar object with a display size that is smaller than a display size of the first avatar object, and the rendering processing load of the second avatar object is made smaller than that of the first avatar object automatically and regardless of any selections made by the second user in generating the second avatar object.

* * * * *